(12) United States Patent
Komma et al.

(10) Patent No.: US 8,614,938 B2
(45) Date of Patent: Dec. 24, 2013

(54) OBJECTIVE LENS UNIT, OPTICAL PICKUP, AND OPTICAL INFORMATION APPARATUS

(75) Inventors: Yoshiaki Komma, Osaka (JP); Kanji Wakabayashi, Kyoto (JP); Kousei Sano, Osaka (JP); Toshiyasu Tanaka, Osaka (JP); Keiichi Matsuzaki, Osaka (JP); Hidenori Wada, Kyoto (JP)

(73) Assignee: Panasonic Corporation, Osaka (JP)

( * ) Notice: Subject to any disclaimer, the term of this patent is extended or adjusted under 35 U.S.C. 154(b) by 61 days.

(21) Appl. No.: 13/014,045

(22) Filed: Jan. 26, 2011

(65) Prior Publication Data

US 2011/0122745 A1    May 26, 2011

Related U.S. Application Data

(63) Continuation of application No. 12/064,360, filed as application No. PCT/JP2006/316641 on Aug. 24, 2006, now Pat. No. 7,944,798.

(30) Foreign Application Priority Data

Aug. 26, 2005 (JP) ................. 2005-245606
Aug. 29, 2005 (JP) ................. 2005-247106
Dec. 22, 2005 (JP) ................. 2005-369638

(51) Int. Cl.
*G11B 7/135* (2012.01)
(52) U.S. Cl.
USPC .............................. 369/112.24; 369/112.01
(58) Field of Classification Search
None
See application file for complete search history.

(56) References Cited

U.S. PATENT DOCUMENTS

| | | | |
|---|---|---|---|
| 5,553,052 A | 9/1996 | Oono et al. | |
| 5,781,351 A | 7/1998 | Murakami et al. | |
| 2001/0012162 A1 | 8/2001 | Kato et al. | |
| 2002/0154582 A1* | 10/2002 | Yonezawa et al. | ......... 369/44.27 |

(Continued)

FOREIGN PATENT DOCUMENTS

| | | |
|---|---|---|
| JP | 62-031037 | 2/1987 |
| JP | 07-201060 | 8/1995 |

(Continued)

OTHER PUBLICATIONS

Notice of Reasons for Rejection, Corresponding Japanese Application No. 2007-532180, issued Sep. 13, 2011, English translation.

(Continued)

*Primary Examiner* — Joseph Feild
*Assistant Examiner* — Carl Adams
(74) *Attorney, Agent, or Firm* — Renner, Otto, Boisselle & Sklar, LLP

(57) ABSTRACT

An objective lens unit according to the present invention includes a first objective lens 41; and a first lens holder 2 for supporting the first objective lens 41. The first lens holder 2 is formed of a material which transmits ultraviolet. Preferably, the first lens holder 2 includes a through-hole, having first and second openings 2a and 2b, through which light incident on the first objective lens 41 passes, and an opening limiting section 3 provided along a circumferential direction of the through-hole and projecting toward a central axis of the through-hole. The first objective lens 41 is supported so as to block the first opening 2b. The opening limiting section 3 guides light incident thereon from the second opening 2a in a direction away from an optical axis of the first objective lens.

13 Claims, 20 Drawing Sheets

(56) References Cited

U.S. PATENT DOCUMENTS

| | | |
|---|---|---|
| 2003/0103441 A1 | 6/2003 | Kim et al. |
| 2003/0227858 A1* | 12/2003 | Komma .................. 369/112.08 |
| 2003/0234990 A1 | 12/2003 | Akanuma |
| 2005/0007906 A1* | 1/2005 | Horinouchi et al. ....... 369/44.37 |
| 2005/0286355 A1 | 12/2005 | Kim et al. |
| 2006/0007812 A1* | 1/2006 | Nishi et al. ................ 369/44.37 |
| 2006/0028935 A1 | 2/2006 | Mori et al. |
| 2008/0163278 A1 | 7/2008 | Wakabayashi et al. |
| 2008/0285421 A1* | 11/2008 | Sato et al. ................ 369/112.23 |
| 2011/0122744 A1* | 5/2011 | Komma et al. ............ 369/44.14 |

FOREIGN PATENT DOCUMENTS

| | | |
|---|---|---|
| JP | 09-223327 | 8/1997 |
| JP | 10-011765 | 1/1998 |
| JP | 11-120587 | 4/1999 |
| JP | 2000-11440 | 1/2000 |
| JP | 2000-242964 | 9/2000 |
| JP | 2001-160229 | 6/2001 |
| JP | 2001-184707 | 7/2001 |
| JP | 2002-245650 | 8/2002 |
| JP | 2003-281758 A | 10/2003 |
| JP | 2004-095133 | 3/2004 |
| JP | 2004-295998 | 10/2004 |
| WO | 2005/104110 | 11/2005 |

OTHER PUBLICATIONS

Notice of Reasons for Rejection for Corresponding Japanese Application No. 2011-246264, mailed Apr. 16, 2013.

Notice of Reasons for Rejection issued on Jul. 2, 2013 for corresponding Japanese Patent Application No. 2011-246263.

Notice of Reasons for Rejection issued on Jul. 2, 2013 for corresponding Japanese Patent Application No. 2011-246264.

Office Action for co-pending U.S. Appl. No. 13/014,031 dated Feb. 21, 2012.

Co-pending U.S. Appl. No. 12/064,360, filed Feb. 21, 2008 (current claims provided).

Co-pending U.S. Application filed Jan. 26, 2011 U.S. Appl. No. 13/014,031.

International Search Report for corresponding Application No. PCT/JP2006/316641 dated Nov. 28, 2006.

Form PCT/ISA/237 and partial English translation corresponding Application No. PCT/JP2006/316641 dated Nov. 28, 2006.

* cited by examiner

OBJECTIVE LENS UNIT, OPTICAL PICKUP, AND OPTICAL INFORMATION APPARATUS

This is a continuation application of U.S. application Ser. No. 12/064,360 filed on Feb. 21, 2008 now U.S. Pat. No. 7,944,798, which is a §371 of International Application PCT/JP2006/316641, with an international filing date of Aug. 24, 2006 which claims priority to JP Application Nos. 2005-245606 filed on Aug. 26, 2005, 2005-247106 filed on Aug. 29, 2005 and 2005-369638 filed on Dec. 22, 2005, the entire contents of which are expressly incorporated by reference herein and is related to co-pending sibling U.S. Application filed on Jan. 26, 2011.

TECHNICAL FIELD

The present invention relates to an optical information apparatus for optically performing recording or reproduction of information, and an optical pickup and an objective lens unit usable for the optical information apparatus. The present invention also relates to an apparatus having such an optical information apparatus applied thereto.

BACKGROUND ART

Optical discs are widely used as information recording mediums capable of recording a large capacity of information. Along with the progress of the technology, optical discs having a higher recording density have been developed.

The optical discs which were first commonly used are compact discs (CDs), and then digital versatile discs (DVDs) have become common. DVDs can record information at a recording density about six times the recording density of CDs. Since a large capacity of data can be recorded on one DVD, DVDs are especially used for recording video information having a large information amount. Recently, optical discs capable of recording information at a still higher recording density, for example, HD-DVDs and Blu-ray discs (BDs), have been developed and have begun to be used especially for recording high precision video information.

As various types of optical discs are developed, compatibility among optical disc apparatuses becomes important. In consideration of the convenience for users, it is preferable that optical disc apparatuses are compatible to a plurality of types of optical discs.

As optical pickups for an optical disc apparatus compatible to a plurality of types of optical discs having different recording densities, optical pickups including a plurality of objective lenses are proposed as shown in, for example, Patent Documents 1 through 3. Such conventional optical pickups are mainly compatible to CDs and DVDs.

Patent Document 1: Japanese Laid-Open Patent Publication No. 10-11765
Patent Document 2: Japanese Laid-Open Patent Publication No. 11-120587
Patent Document 3: Japanese Laid-Open Patent Publication No. 2002-245650

DISCLOSURE OF THE INVENTION

Problems to be Solved by the Invention

However, the present inventors examined optical disc apparatuses compatible both to an optical disc capable of recording information at a higher recording density such as HD-DVDs or BDs and to conventional CDs and DVDs, and found the following problems.

For example, in an optical pickup including two objective lenses, the two objective lenses are supported by a common objective lens holder, and the objective lens holder is driven by one objective lens actuator.

Accordingly, the two objective lenses each need to be secured to the objective lens holder while being optimally positioned to an optical axis in an optical system which uses the respective objective lens. In order to realize this, Patent Document 1 discloses the following. One objective lens is secured to a tilting holder. The inclination of the titling holder with respect to the objective lens holder is adjusted and secured with an adjusting screw. Then, the titling holder is fixed to the objective lens holder with an adhesive.

With this structure, however, the tilting holder needs to be secured once with an adjusting screw. This makes the positional adjustment troublesome. There is another problem that a size of an opening for the objective lens varies depending on the inclination of the tilting holder, and so a desired numerical aperture (NA) cannot be guaranteed.

With an optical disc such as a HD-DVD or a BD, an optical spot for performing recording or reproduction needs to be made small using an objective lens having a large numerical aperture (NA) in order to achieve the high recording density. This requires a large through-hole to be formed in the lens holder for securing the objective lens.

Due to the large through-hole, such a lens holder has a reduced rigidity and thus is likely to be resonated at a predetermined frequency. As a result of examinations, the present inventor found that this resonance influences the operation of the objective lens actuator for driving the objective lens holder, which may occasionally make it difficult to control the objective lens at a high level of precision.

For performing a recording or reproduction operation on or from a plurality of optical discs having different recording densities, the required control precision varies. In general, for performing a recording or reproduction operation on or from an optical disc having a low recording density, a high level of control precision is not required. However, due to the low recording density, the objective lens is required to move in a large area. By contrast, for performing a recording or reproduction operation on or from an optical disc having a high recording density, a high level of control precision is required, but the area in which the objective lens moves may be small.

In the case where a plurality of objective lenses are supported by an objective lens holder, it is difficult to fulfill such different specifications because the objective lens holder is driven by one actuator.

The present invention made to solve at least one of these problems of the conventional art has an object of providing an optical pickup including a plurality of objective lenses, and an optical information apparatus.

Means for Solving the Problems

An objective lens unit according to the present invention comprises a first objective lens; and a first lens holder for supporting the first objective lens. The first lens holder is formed of a material which transmits ultraviolet.

In one preferable embodiment, the first lens holder includes a through-hole, having first and second openings, through which light incident on the first objective lens passes, and an opening limiting section provided along a circumferential direction of the through-hole and projecting toward a central axis of the through-hole. The first objective lens is supported so as to block the first opening. The opening limiting section guides light incident thereon from the second opening in a direction away from an optical axis of the first objective lens.

In one preferable embodiment, the opening limiting section has a first ring-shaped inclined surface inclining with respect to an inner surface of the through-hole so as to face the first opening.

In one preferable embodiment, the opening limiting section has a second ring-shaped inclined surface inclining with respect to an inner surface of the through-hole so as to face the second opening.

In one preferable embodiment, the opening limiting section has a first ring-shaped inclined surface inclining with respect to an inner surface of the through-hole so as to face the first opening, and a second ring-shaped inclined surface inclining with respect to an inner surface of the through-hole so as to face the second opening.

In one preferable embodiment, where an angle made by light incident on the second ring-shaped inclined surface and the normal to the second ring-shaped inclined surface is A1, an angle made by light output from the second ring-shaped inclined surface and the normal to the second ring-shaped inclined surface is A2, an angle made by the light incident on the second ring-shaped inclined surface and the normal to the first ring-shaped inclined surface is A3, and a refractive index of the opening limiting section is n, the objective lens unit fulfills relationships of $\sin(A1)=n\cdot\sin(A2)$ and $n\cdot\sin(A3+(A1-A2))>1$.

In one preferable embodiment, the ring-shaped inclined surface has two discontinuous ring-shaped inclined surfaces located concentrically.

In one preferable embodiment, the opening limiting section has a shape forming a part of a concave lens having an axis matching the central axis of the through-hole.

In one preferable embodiment, a cross-section of the opening limiting section taken along the central axis of the through-hole is a part of an ellipse projecting toward the central axis.

In one preferable embodiment, the opening limiting section has a diffraction grating provided so as to face the first opening.

In one preferable embodiment, the opening limiting section has a scattering surface provided so as to face the first opening for scattering light.

In one preferable embodiment, the opening limiting section has a light beam shielding surface provided so as to face the first opening for shielding light.

An optical pickup according to the present invention comprises a first light source; an objective lens defined by any one of the above; a support for supporting the objective lens; an actuator for driving the support; and a first light detector. Light emitted by the light source is collected on a data recording face of an optical disc by the first objective lens of the objective lens, and light reflected by the data recording face is converted into an electric signal by the light detector.

In one preferable embodiment, the first lens holder of the objective lens unit is bonded to the support with an ultraviolet-curable resin.

In one preferable embodiment, the optical pickup further comprises a second objective lens which does not share an optical axis with an optical system formed by the objective lens unit, and a second light source. The support is a second lens holder for supporting the second objective lens.

In one preferable embodiment, an interval between an optical axis of the first objective lens and an optical axis of the second objective lens is 5 mm or less.

In one preferable embodiment, an interval between an optical axis of the first objective lens and an optical axis of the second objective lens is 2.5 mm or greater and 5 mm or less.

In one preferable embodiment, the first objective lens and the second objective lens are arranged in a tracking direction of the optical disc.

In one preferable embodiment, the first objective lens and the second objective lens are arranged in a direction perpendicular to a tracking direction of the optical disc.

In one preferable embodiment, the first lens holder has a flat side surface at a position proximate to the second objective lens.

In one preferable embodiment, the first lens holder has a flat side surface at a position facing an outer peripheral area of the optical disc.

In one preferable embodiment, the first objective lens is used to collect light having a longer wavelength than light collected by the second objective lens.

In one preferable embodiment, the first lens holder has a cutout at a position symmetrical to the flat side surface with respect to an optical axis of the first objective lens.

In one preferable embodiment, the optical pickup further comprises a projection projecting from each of the first lens holder and the second lens holder more than the first objective lens and the second objective lens. The projection is provided in an area other than an area facing an outer peripheral area of the optical disc.

In one preferable embodiment, the optical pickup further comprises a second light source, a second detector and a second objective lens. The first light source emits light having a first wavelength; the first objective lens collects the light emitted by the first light source toward a recording face of a first optical disc; the first detector receives reflected light of the light collected on the recording face of the first optical disc and outputs a detection signal; the second light source emits light having a second wavelength which is shorter than the first wavelength; the second objective lens collects the light emitted by the second light source toward a recording face of a second optical disc; the second detector receives reflected light of the light collected on the recording face of the second optical disc and outputs a detection signal; and a focusing detection range of a focusing error signal generated based on the detection signal output by the first detector is larger than a focusing detection range of a focusing error signal generated based on the detection signal output by the second detector.

In one preferable embodiment, the optical pickup further comprises a first collimator lens for decreasing a divergence degree of the light emitted by the first light source; and a second collimator lens for decreasing a divergence degree of the light emitted by the second light source. A first magnitude obtained by dividing a focal length of the first collimator lens by a focal length of the first objective lens is smaller than a second magnitude obtained by dividing a focal length of the second collimator lens by a focal length of the second objective lens.

In one preferable embodiment, a focal length of the first objective lens is longer than a focal length of the second objective lens.

In one preferable embodiment, the optical pickup further comprises a first collimator lens for decreasing a divergence degree of the light emitted by the first light source; and a second collimator lens for decreasing a divergence degree of the light emitted by the second light source. A focal length of the first collimator lens is shorter than a focal length of the second collimator lens.

An optical information apparatus according to the present invention comprises an optical pickup defined by any one of the above; a motor for driving an optical disc to rotate; and an electric circuit for controlling the optical pickup based on a signal obtained from at least the first light detector of the optical pickup.

A computer according to the present invention comprises the above-described optical information apparatus.

An optical disc player according to the present invention comprises the above-described optical information apparatus.

A car navigation system according to the present invention comprises the above-described optical information apparatus.

An optical disc recorder according to the present invention comprises the above-described optical information apparatus.

An optical disc server according to the present invention comprises the above-described optical information apparatus.

A vehicle according to the present invention comprises the above-described optical information apparatus.

A method according to the present invention for assembling an optical pickup described above comprises a first step of adjusting an inclination of the entirety of the first lens holder, such that a comatic aberration on the recording face of the optical disc when a light beam from the second light source is collected by the second objective lens is minimized; and a second step of, in the state where the inclination of the entirety of the first lens holder adjusted in the first step is kept, adjusting an inclination of the objective lens unit with respect to the first lens holder, such that a comatic aberration on the recording face of the optical disc when a light beam from the first light source is collected by the second objective lens is minimized.

In one preferable embodiment, the optical pickup further includes a third light source for emitting light to be collected by the second objective lens; and the method further comprises a third step of, after the second step, adjusting a position in a vertical direction of the third light source with respect to an optical axis of a light beam from the third light source, such that a comatic aberration on the recording face of the optical disc when the light beam from the third light source is collected by the second objective lens is minimized.

An objective lens driving device according to the present invention comprises a movable body including a first objective lens and a second objective lens for converging a light beam to an optical disc, and a support for supporting the first objective lens and the second objective lens. An interval between an optical axis of the first objective lens and an optical axis of the second objective lens is 5 mm or less.

In one preferable embodiment, an interval between an optical axis of the first objective lens and an optical axis of the second objective lens is 2.5 mm or greater and 5 mm or less.

An objective lens driving device according to the present invention comprises a movable body including a first objective lens and a second objective lens for converging a light beam to an optical disc, a first lens holder for supporting the first objective lens, and a second lens holder for supporting the second objective lens. The first lens holder is secured to the second lens holder. The first lens holder has a flat side surface at a position proximate to the second objective lens supported by the second lens holder.

In one preferable embodiment, the first lens holder has the flat side surface at a position facing an outer peripheral area of the optical disc.

In one preferable embodiment, the first objective lens is used to collect light having a longer wavelength than light collected by the second objective lens.

In one preferable embodiment, the first lens holder has a cutout at a position symmetrical to the flat side surface with respect to an optical axis of the first objective lens.

In one preferable embodiment, the objective lens driving device further comprises a projection projecting from each of the first lens holder and the second lens holder more than the first objective lens and the second objective lens.

The projection is provided in an area other than an area facing an outer peripheral area of the optical disc.

Effects of the Invention

An objective lens unit according to the present invention is formed of a material which transmits ultraviolet. Therefore, the objective lens unit can be fixed to a support with an ultraviolet-curable resin after the inclination of the objective lens unit is adjusted. Thus, the position or inclination of the objective lens unit can be easily adjusted.

The objective lens unit includes an opening limiting section. Therefore, even after the inclination of the objective lens unit with respect to the support is adjusted, the diameter of the light beam incident on the objective lens from outside can be adjusted and kept the same by the opening limiting section.

In an optical pickup according to the present invention, the distance between the optical axes of the two objective lenses is 5 mm or less. Therefore, the deterioration in the servo control performance, which would be otherwise caused by resonance of the lens holder, can be suppressed, and a stable control is realized.

The first lens holder has a flat side surface at a position proximate to the second objective lens. Therefore, the distance between the two objective lenses can be made short, and thus the distance between the optical axes of the two objective lenses can be made short.

Figure 1:
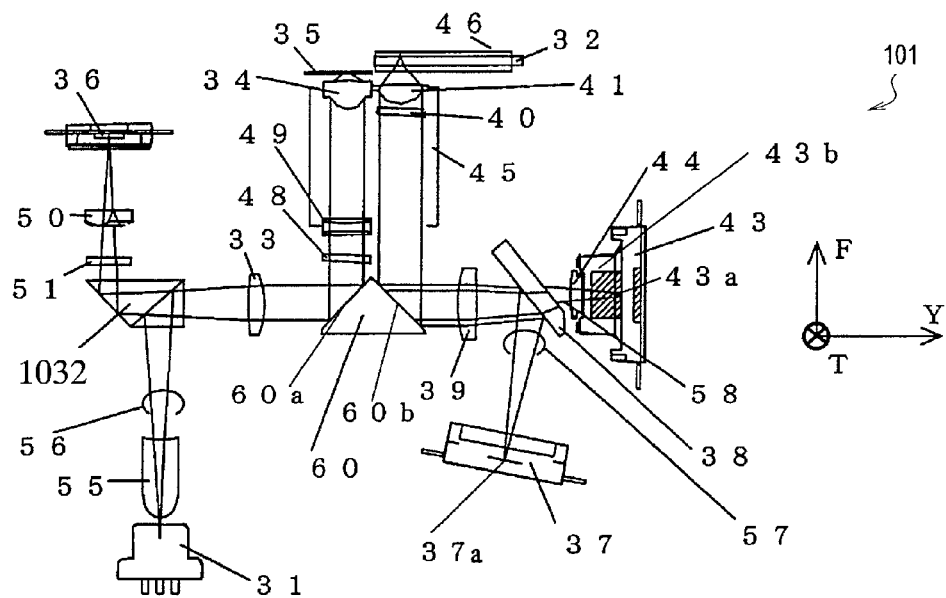
FIG. 1 is a schematic side view showing an optical pickup according to Embodiment 1 of the present invention.

DESCRIPTION OF THE REFERENCE NUMERALS 1, 2 Lens holder
3 Opening limiting section
31, 37a, 43a Light source
34, 41 Objective lens
33, 39 Collimator lens
32, 35, 46 Optical disc
45 Objective lens driving device
56, 57, 58 Light beam

BEST MODE FOR CARRYING OUT THE INVENTION

Embodiment 1

Figure 2:
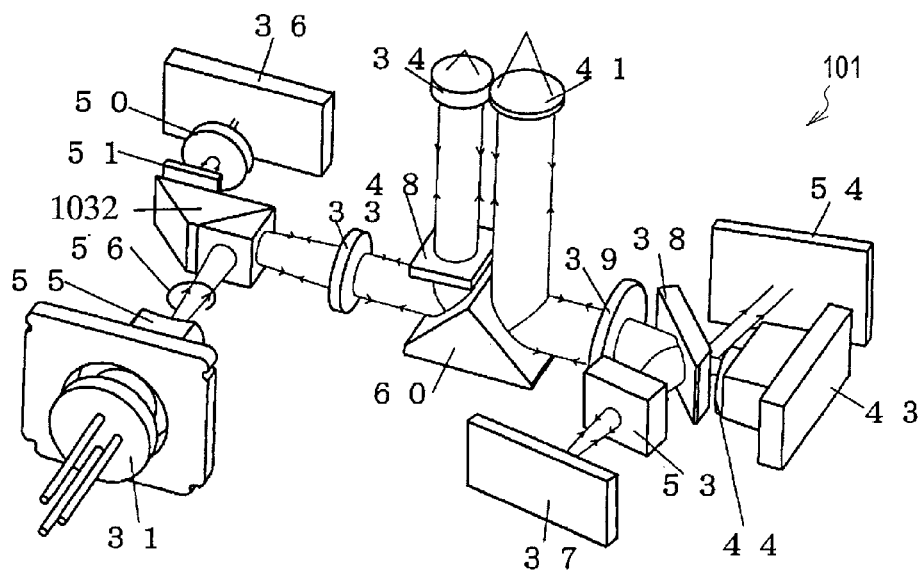
FIG. 2 is a schematic isometric view showing the optical pickup according to Embodiment 1 of the present invention.

Hereinafter, an optical pickup according to Embodiment 1 of the present invention will be described. FIGS. 1 and 2 are respectively a schematic side view and a schematic isometric view of an optical pickup 101.

In FIG. 1, direction T is a tracking direction, and direction F is a focusing direction. Direction Y is vertical to the tracking direction. The optical pickup 101 are located such that these directions respectively match the tracking direction of an optical information apparatus (optical disc apparatus), the focusing direction of the optical information apparatus, and a direction vertical to the tracking direction of the optical information apparatus. It is also possible to locate the optical pickup 101 such that the direction Y and the direction T respectively match the tracking direction of the optical information apparatus and a direction vertical thereto.

The optical pickup 101 is capable of performing at least one of recording and reproduction on and from three optical discs 32, 35 and 46 having different recording densities. The optical discs 32, 35 and 46 are, for example, a DVD, a BD and a CD.

In order to perform at least one of recording and reproduction on and from the optical disc 35 having the highest recording density, the optical pickup 101 includes a light source 31 and an objective lens 34.

The light source 31 emits light having a shortest wavelength (for example, blue light). The light emitted by the light source 31 is linear polarization of a predetermined direction. A polarization beam splitter 1032 guides the light emitted by the light source 31 to a collimator lens 33. The polarization beam splitter 1032 strongly reflects linear polarization of the direction of the light emitted by the light source 31 and transmits light of a direction perpendicular thereto at a high ratio. The polarization beam splitter 1032 also provides an effect of improving the light utilization factor when being combined with a ¼ waveplate 48 as described below.

The collimator lens 33 converts a convergence state of a light beam 56 radiated by the light source 31 such that the light beam 56 becomes generally parallel light. A prism 60 has an inclined surface 60a, and reflects the light beam 56 transmitted through the collimator lens 33 in a direction perpendicular to the optical disc 35. The objective lens 34 converges the light beam 56 on a recording face of the optical disc 35. The light beam reflected by the recording face of the optical disc 35 travels in the opposite direction to the above, is branched in a different direction from the direction toward the light source 31 by branching means such as the polarization beam splitter 1032 or the like, and is incident on a light detector 36. The light detector 36 performs optoelectric conversion on the incident light and outputs an electric signal for obtaining an information signal or a servo signal (a focusing error signal for focusing control or a tracking signal for tracking control).

By providing the ¼ waveplate 48 between the polarization beam splitter 1032 and the objective lens 34, the linear polarization reflected by the polarization beam splitter 1032 can be converted into circular polarization. The light beam 56, which has become circular polarization of the opposite direction as a result of being reflected by the recording face of the optical disc 35, is converted into linear polarization of a direction perpendicular to the original direction thereof when being incident again on the ¼ waveplate 48. Since this light is transmitted through the polarization beam splitter 1032 at a high ratio, the light utilization factor can be improved.

It is also allowed to locate an axial astigmatism generation element 50 such as a cylindrical lens, a toric lens or the like between the polarization beam splitter 1032 and the light detector 36 and to locate a quadrant light detection area (not shown) in the light detector 36. By adopting such a structure so that light provided with axial astigmatism by the axial astigmatism generation element 50 is received, a focusing error signal generated by an axial astigmatism method can be detected. In the case where a lens power for collecting or diffusing light to the axial astigmatism generation element 50 is added, the axial astigmatism generation element 50 can be moved toward an optical axis and perform an offset adjustment of the focusing error signal. By locating a diffractive optical element (DOE) 51 between the polarization beam splitter 1032 and the light detector 36, a stable tracking signal of a one-beam system can be obtained.

The optical pickup 101 includes a light source 37a and an objective lens 41. The light source 37a is accommodated in an integral unit 37, and radiates light having a longer wavelength than the light emitted by the light source 31 (for example, radiates red light). A collimator lens 39 converts a convergence state of a light beam 57 radiated by the light source 37a such that the light beam 57 becomes generally parallel light. The light beam 57 transmitted through the collimator lens 39 is reflected by an inclined surface 60b, which is different from the inclined surface 60a, of the prism 60 in a direction perpendicular to the optical disc 32.

The objective lens 41 converges the light beam 57 on a recording face of the optical disc 32. The light beam reflected by the recording face of the optical disc 32 travels in the opposite direction to the above, is branched in a different direction from the forward path by branching means such as a polarization hologram 40 or the like, and is incident on a light detector (not shown) in the integral unit 37 for optoelectric conversion. Thus, an electric signal for obtaining an information signal or a servo signal (a focusing error signal for focusing control or a tracking signal for tracking control) is output. By using the integral unit 37 having the light detector and the light source 37a built therein, the optical pickup can be reduced in size and thickness and can be stabilized in operation.

The optical pickup 101 also includes a light source 43a. The light source 43a is accommodated in an integral unit 43, and radiates light having a longest wavelength (for example, red light). The collimator lens 39 converts a convergence state of a light beam 58 radiated by the light source 43a such that the light beam 58 becomes generally parallel light. The light beam 58 transmitted through the collimator lens 39 is reflected by the inclined surface 60b of the prism 60 in a direction perpendicular to the optical disc 46.

The objective lens 41 converges the light beam 58 on a recording face of the optical disc 46. The light beam 58 reflected by the recording face of the optical disc 46 travels in the opposite direction to the above, is branched in a different direction from the direction toward the light source 43a by branching means such as a hologram 43b or the like, and is incident on a light detector (not shown) in the integral unit 43 for optoelectric conversion. Thus, an electric signal for obtaining an information signal or a servo signal (a focusing error signal for focusing control or a tracking signal for tracking control) is output. By using the integral unit 43 having the light detector and the light source 43a built therein, the optical pickup can be reduced in size and thickness and can be stabilized in operation.

As shown in FIGS. 1 and 2, the optical pickup 101 includes a beam splitter 38 having a dichroic film for assembling or branching light emitted by the light sources 37a and 43a. A part of the light emitted by the light source 43a is reflected by the beam splitter 38 and is guided to a light detector 54. The rest of the light is transmitted through the collimator lens 39. The beam splitter 38 also transmits a part of the light reflected by the optical disc 46 and guides the part of the light to the integral unit 43. The beam splitter 38 totally reflects the light emitted by the light source 37a.

The prism 60 has a triangular cross-section, but the apexes (ridges when seen from the viewpoint of the entire shape of the prism) may be chamfered to prevent chipping. With this case being encompassed, the prism 60 has a generally triangular cross-section.

In this embodiment, the optical pickup 101 is compatible to three types of optical discs and includes three light sources. In order to realize an optical information apparatus compatible to two types of optical discs, the optical pickup 101 may include either the light source 43a or 37a, and the light source 31.

The optical pickup 101 includes an objective lens driving device 45, and the objective lenses 34 and 41 are located at predetermined positions in the objective lens driving device 45. The objective lenses 34 and 41 are preferably arranged in a line in the direction Y, in which the tracking grooves of the optical disc extend, or in a direction perpendicular to the tracking direction. This prevents the situation where when the objective lens 34 or 41 accesses an outermost area or an innermost area of the optical disc 32, 35 or 46, the objective lens 34 or 41 which is not in use interferes a motor for rotating the optical disc 32, 35 or 46 or an external area of the optical information apparatus.

The objective lens driving device (objective lens actuator) 45 can move the objective lenses 34 and 41 either in the focusing direction F perpendicular to the recording face of the optical discs 35, 32 and 46 or in the tracking direction T of the optical discs. Thus, the objective lens driving device 45 can adjust the light collection state of the optical spot used for performing recording or reproduction on or from the optical discs 32, 35 and 46. The objective lens driving device 45 can also move the optical spot in the tracking direction.

Figure 3:
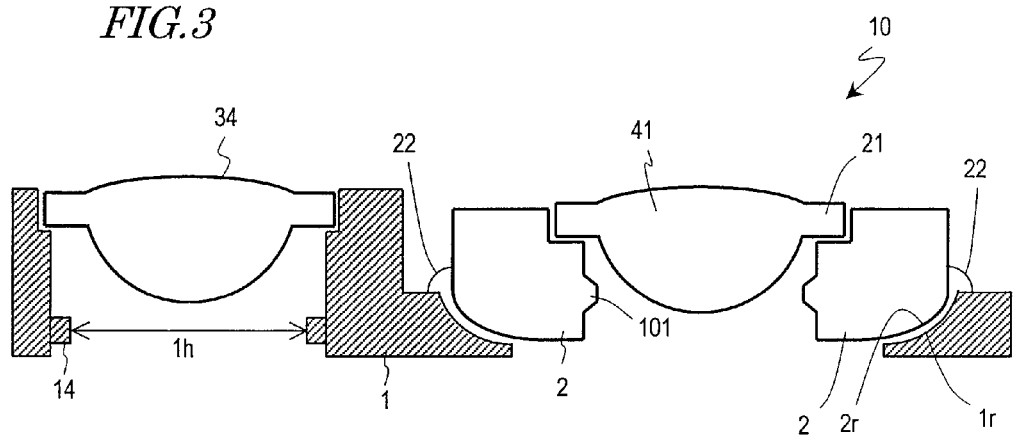
FIG. 3 shows a cross-section of a movable section of an objective lens driving device usable for the optical pickup shown in FIG. 1.

FIG. 3 shows a cross-section of a movable section of the objective lens driving device 45. The movable section supports and secures the objective lenses 34 and 41. A driving mechanism such as a coil, a magnet or the like (not shown) moves the movable section in the focusing direction or the tracking direction, and thus the objective lenses 34 and are moved in the focusing direction or the tracking direction.

After the objective lenses 34 and 41 are both secured in the movable section, the orientation of the objective lens 34 or 41 cannot be adjusted independently. Therefore, the direction of the optical axis of the objective lens 41 with respect to the optical axis of the objective lens 34 needs to be adjusted beforehand.

In this embodiment, the movable section includes an objective lens unit 10 in which the objective lens 34, a lens holder 1, and the objective lens 41 are supported. The orientation of the objective lens unit 10 can be adjusted with respect to the first lens holder 1 to which the objective lens 34 is secured. For this end, the objective lens unit 10 includes a lens holder 2. The lens holder 2 supports and secures the objective lens 41. The lens holder 2 has a curved bottom part 2r, and is supported and secured such that a curved recess 1r of the lens holder 1 contacts the bottom part 2r of the lens holder 2.

Since the bottom part 2r of the lens holder 2 is curved, the lens holder 2 and the lens holder 1 can be secured after the inclination of the lens holder 2 is adjusted inside the recess 1r of the lens holder 1.

The inclination of the lens holder 2 is adjusted by, for example, the following procedure. First, the inclination of the lens holder 1 is adjusted such that when the light beam 56 reflected by the inclined surface 60a in FIG. 1 is collected by the objective lens 34, the comatic aberration is minimized or the convergence spot is most symmetric with respect to the optical axis. This adjustment is performed by adjusting the position of the lens holder 1 in the movable section or by adjusting the inclination of the objective lens driving device 45 with respect to the optical axis of the light beam 56 reflected by the inclined surface 60a.

Then, in this state, the inclination of the lens holder 2 having the objective lens 41 secured thereto is adjusted with respect to the lens holder 1. This adjustment is performed such that when the light beam 57 reflected by the inclined surface 60b is collected by the objective lens 41, the comatic aberration is minimized or the convergence spot is most symmetric with respect to the optical axis. Then, the position of the light source 43a is adjusted in a direction vertical to the optical axis, such that when the light beam 58 reflected by the inclined surface 60b is collected by the objective lens 41, the comatic aberration is minimized or the convergence spot is most symmetric with respect to the optical axis.

According to the conventional art disclosed in Patent Document 1, the inclination of each of the two objective lenses is determined such that the optical axes of the two objective lenses are parallel to each other. With this method, however, the comatic aberration generated by a production error of the objective lenses or the comatic aberration of the light beam generated by a production error of the other optical components is left remaining, and so the convergence beam is distorted.

By contrast, with the adjusting method according to this embodiment, the comatic aberration can be comprehensively reduced or the shape of the convergence beam can be optimized. Therefore, an optical pickup exhibiting superb recording or reproduction performance on or from a plurality of different types of optical discs is realized.

After the inclination of the lens holder 2 with respect to the lens holder 1 is adjusted as described above, the lens holder 2 is bonded to the lens holder 1 with an adhesive 22 as shown in FIG. 3. For bonding electronic components, thermosetting adhesives are widely used in general. However, use of a thermosetting adhesive requires a high temperature tank, which requires extra production equipment. Where an adhesive curable over-time is used, the time necessary for curing is preferably as short as possible from the viewpoint of shortening the production time. However, where the time necessary for curing is short, the adhesive is progressively cured while the inclination of the lens holder 2 is adjusted. This makes the adjustment difficult.

In this embodiment, it is preferable to use an ultraviolet-curable resin as the adhesive 22 in consideration of these points. The adhesive 22 is preferably applied also to a gap between the lens holder 1 and the lens holder 2 to strongly bond the lens holder 1 and the lens holder 2 to each other. The lens holder 2 is preferably formed of a material which transmits ultraviolet in order to cure the adhesive 22 applied to the gap between the lens holder 1 and the lens holder 2. A polyolefin-based resin or a polycarbonate-based resin transmits ultraviolet and has stable physical properties while costing low, and so is suitable as a material for forming the lens holder 2. The lens holder 1 is formed of a material which does not transmit visible light or ultraviolet.

After the optical axis of the objective lens 41 is adjusted by the above-described procedure, the adhesive 22 is irradiated with ultraviolet to be cured and thus the lens holder 2 is fixed to the lens holder 1. This prevents the situation where the adjustment is made difficult as a result of the adhesive 22 being cured while the optical axis of the objective lens 41 is adjusted. Since an ultraviolet-curable resin can be cured in a relatively short time, the time required for the adjustment is shortened. Since the lens holder 2 transmits ultraviolet, the adhesive 22 can be cured uniformly. Since only a light source for providing the ultraviolet is additionally needed, the cost for the equipment is low. There is also an effect that the time necessary for bonding and fixing the lens holders is short.

The objective lens fixed to the lens holder 2 is preferably included in an optical system used for recording or reproduction on or from an optical disc having a relatively low recording density. The control precision required for performing recording or reproduction on or from an optical disc having a low recording density may be lower than the control precision required for performing recording or reproduction on or from an optical disc having a high recording density. Therefore, the precision required for adjusting the optical axis of the objective lens may also be lower for an optical disc having a low recording density than for an optical disc having a high recording density. For this reason, the optical axis is adjusted more easily where the objective lens fixed to the lens holder 2 is included in an optical system used for an optical disc having a relatively low recording density.

As shown in FIG. 3, the lens holder 1 includes an opening limiting section 14 projecting inward in a through-hole which defines the optical path of the light beam incident on the objective lens 34. The opening limiting section 14 is provided to define an opening 1h in order to cause a desired size of light beam to be incident on the objective lens 34. The opening limiting section 14 is also formed of a material which does not transmit visible light or ultraviolet.

In the case where the lens holder 2 is formed of a material which transmits ultraviolet, the lens holder 2 also transmits visible light. This makes it difficult to cause a desired size of light beam to be incident on the objective lens 41 and thus to obtain a desired numerical aperture (NA). According to the present invention, the objective lens unit includes an opening limiting section 3. Now, with reference to FIG. 4, the opening limiting section 3 will be described in detail.

Figure 4:
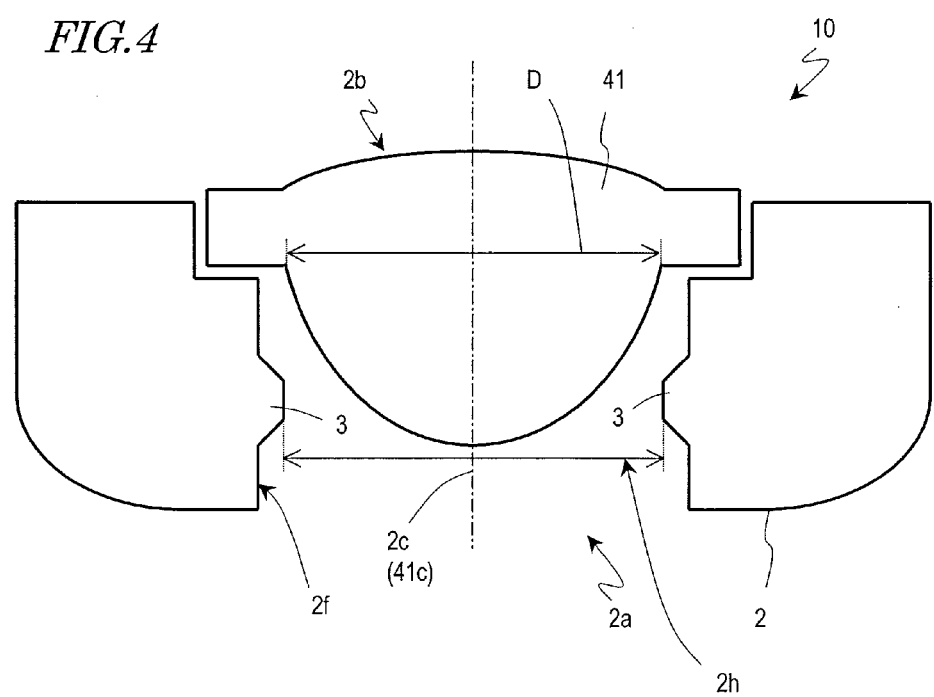
FIG. 4 is an enlarged cross-sectional view of a lens unit usable for the optical pickup shown in FIG. 1.

FIG. 4 is an enlarged cross-sectional view of the lens unit 10. As shown in FIG. 4, the lens holder 2 has a through-hole having a first opening 2b and a second opening 2a and defined by an inner surface 2f. The objective lens 41 is supported by the lens holder 2 so as to block the first opening 2b, and light transmitted through the through-hole from the second opening 2a is incident on the objective lens 41. The opening limiting section 3 is provided along a circumferential direction of the inner surface 2f of the through-hole and has a shape projecting toward a central axis 2c of the through-hole. Owing to this, the opening limiting section 3 defines a diameter 2h of the light beam incident on the objective lens 41. The central axis 2c of the through-hole generally matches a center 41c of the objective lens 41. The opening 2h defined by the opening limiting section 3 is set to have a size equal to or smaller than effective diameter D within which the objective lens 41 acts as a lens.

As described above, the lens holder 2 transmits ultraviolet and visible light. Therefore, where the opening limiting section 3 is formed of the same material as the lens holder 2 integrally therewith, the incident light is also transmitted through the opening limiting section 3. As a result, the light cannot be shielded from being incident on the objective lens 41 and a predetermined light diameter cannot be obtained. In order to avoid this, the lens holder has a structure for guiding the light incident on the opening limiting section 3 from the second opening 2a of the opening limiting section 3 in a direction away from the optical axis of the objective lens 41.

Figure 5:
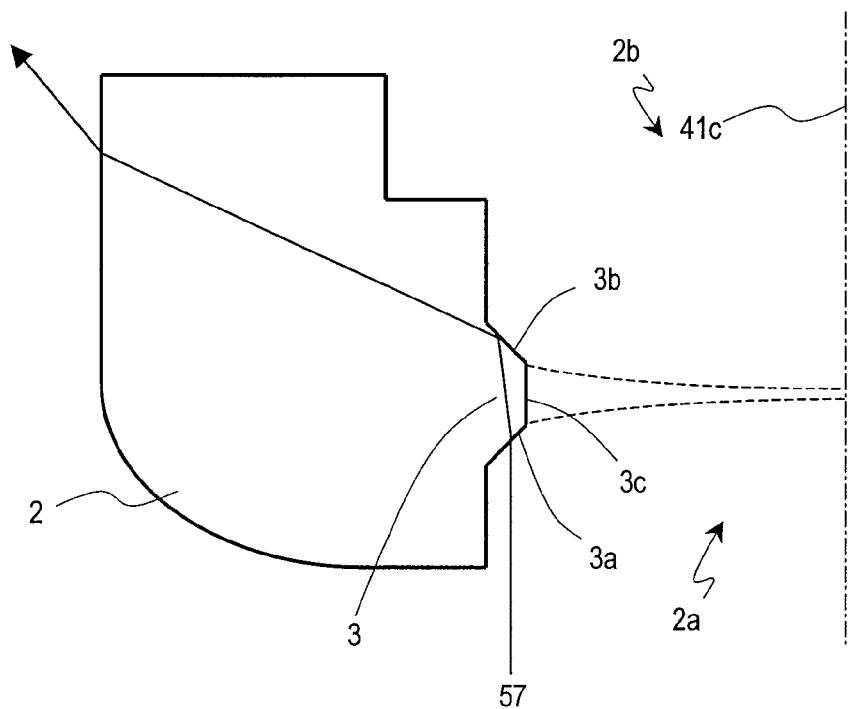
FIG. 5 is a partial enlarged cross-sectional view of a lens holder usable for the optical pickup shown in FIG. 1.

FIG. 5 is a partial enlarged cross-sectional view of the lens holder 2. As shown in FIG. 5, the opening limiting section 3 has a trapezoidal cross-section. Owing to two inclined sides of the trapezoid, the opening limiting section 3 includes a first ring-shaped inclined surface 3a and a second ring-shaped inclined surface 3b both projecting in the through-hole of the lens holder 2. The first ring-shaped inclined surface 3a and the second ring-shaped inclined surface 3b are inclined with respect to the inner surface 2f so as to face the first opening 2b and the second opening 2a respectively. A side surface 3c of the opening limiting section 3 is generally parallel to the inner surface 2f.

As shown in FIG. 5, among the light incident on the first opening 2b, the light 57 incident on the opening limiting section 3 is transmitted through the opening limiting section 3 from the first ring-shaped inclined surface 3a. At this point, the light 57 is refracted in a direction away from the optical axis 41c by the first ring-shaped inclined surface 3a. Thus, the light incident on the opening limiting section 3 can be prevented from being incident on the objective lens 41. As a result, as shown in FIG. 4, only the light having the diameter 2h defined by the opening limiting section 3 can be incident on the objective lens 41.

As represented with the dashed line in FIG. 5, the first ring-shaped inclined surface 3a and the second ring-shaped inclined surface 3b of the opening limiting section 3 may be a part of two spherical surfaces of a concave lens which generally matches the optical axial 41c. Even with such a shape of the first ring-shaped inclined surface 3a and the second ring-shaped inclined surface 3b, the light 57 incident on the opening limiting section 3 can be refracted in a direction away from the optical axis 41c. With such a structure, even where the opening limiting section 3 is formed of a material which transmits visible light and ultraviolet, the light can be shielded by the opening limiting section 3 to cause light having a desired diameter to be incident on the objective lens 41.

The opening limiting section 3 is provided in the through-hole, through which the light incident on the objective lens 41 supported by the lens holder 2 passes. Therefore, the opening limiting section 3 can be located proximate to the objective lens 41, and the shift of the center of the opening limiting section 3 from the optical axis of the objective lens 41 is decreased. In addition, when adjusting the inclination of the objective lens 41 with respect to the lens holder 1, the adjustment is performed for the entire lens unit including the objective lens 41 and the lens holder 2. Therefore, the shift of the center of the opening limiting section 3 from the optical axis of the objective lens 41 does not occur, and the diameter of the light incident on the objective lens 41 is always determined by the opening limiting section 3. This can minimize the error in the diameter of the light incident on the objective lens 41.

Figure 6:
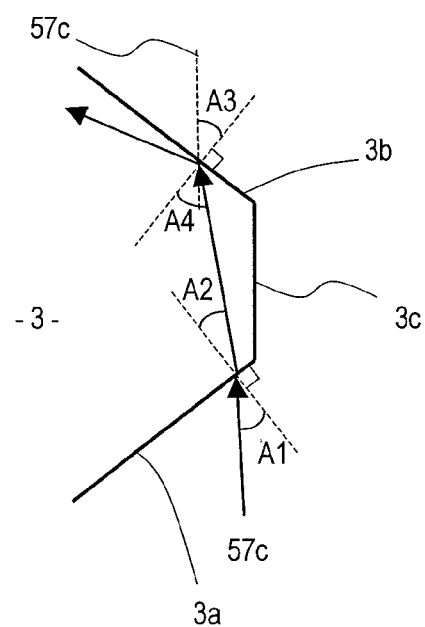
FIG. 6 illustrates an optical path of light incident on an opening limiting section of the lens holder.

In order to improve the effect of shielding the light provided by the opening limiting section 3, the total reflection of light on the second ring-shaped inclined surface 3b may be used. Specifically, this is done as follows. As shown in FIG. 6, an angle made by the light 57 incident on the first ring-shaped inclined surface 3a and the normal to the first ring-shaped inclined surface 3a is set to A1, and an angle made by the light traveling inward into the opening limiting section 3 from the first ring-shaped inclined surface 3a and the normal to the first ring-shaped inclined surface 3a is set to A2. An angle made by the light incident on the second ring-shaped inclined surface 3b and the normal to the second ring-shaped inclined surface 3b is set to A4, and an angle made by the light output from the second ring-shaped inclined surface 3b and the normal to the second ring-shaped inclined surface 3b is set to A3. A refractive index of the material forming the opening limiting section 3 is set to n.

By the Snell's law, these angles fulfill expressions (1) and (2).

$$\sin(A1) = n \cdot \sin(A2) \quad (1)$$

$$A4 = A3 + (A1 - A2) \quad (2)$$

The condition under which total reflection occurs on the second ring-shaped inclined surface 3b is represented by expression (3).

$$n \cdot \sin(A4) > 1 \quad (3)$$

By substituting expression (2) for expression (3), the relationship of expression (4) is obtained.

$$n \cdot \sin(A3 + (A1 - A2)) > 1 \quad (4)$$

Namely, as long as angle A1 and angle A3 fulfill the relationships of expressions (1) and (4), all the light incident on the first ring-shaped inclined surface 3a can be refracted in a direction away from the optical axis 41c and can be prevented from being incident on the objective lens 41.

Such a structure prevents unnecessary light beams from being incident on the objective lens 41, and thus provides an effect of completely removing stray light components.

The opening limiting section 3 provided in the lens holder 2 may have a structure other than that shown in FIG. 5 or 6.

Figure 7A:
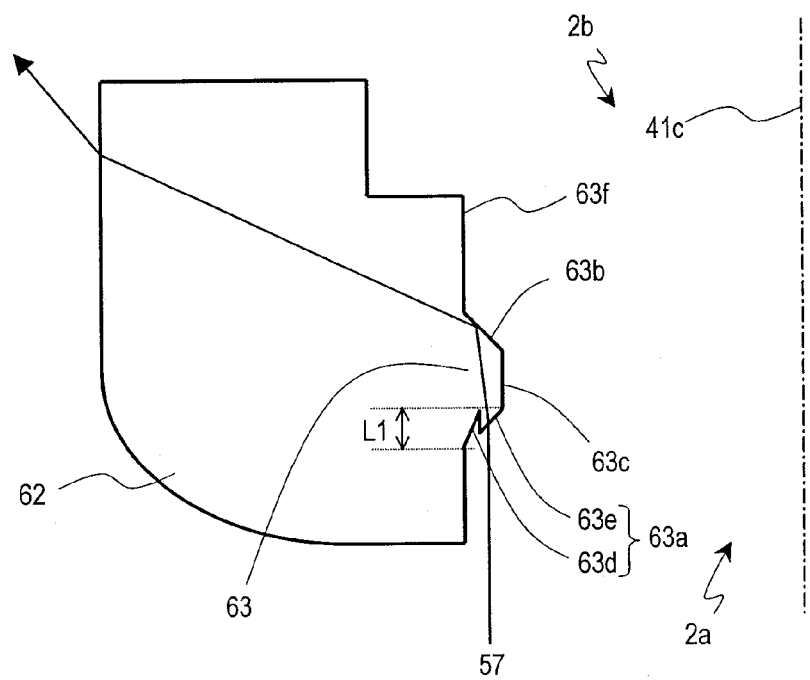
FIG. 7A is a cross-sectional view showing another embodiment of the opening limiting section of the lens holder.

As shown in FIG. 7A, an opening limiting section 63 provided in a lens holder 62 includes two ring-shaped inclined surfaces 63d and 63e, concentrically provided, a second ring-shaped inclined surface 63b, and a side surface 63c. The ring-shaped inclined surfaces 63d and 63e are inclined to face the first opening 2b, and are discontinuous to each other. The ring-shaped inclined surfaces 63d and 63e act as a first ring-shaped inclined surface 63a, and guide the light incident on the opening limiting section 63 in a direction away from the optical axis 41c as described with reference to FIG. 5.

By forming the first ring-shaped inclined surface 63a of the two discontinuous ring-shaped inclined surfaces 63d and 63e, the inclining angle of each of the ring-shaped inclined surfaces 63d and 63e with respect to an inner surface 63f can be decreased. Therefore, the light incident on the opening limiting section 63 can be refracted in a direction further away from the optical axis 41c. In addition, length L1 necessary to form the ring-shaped inclined surfaces 63d and 63e on the inner surface 63f can be shorter than the length necessary for forming one ring-shaped surface inclined at the same angle. Accordingly, the length of the lens holder 62 in the direction of the through-hole can be decreased. This is suitable to realize a thin optical information apparatus.

Figure 7B:
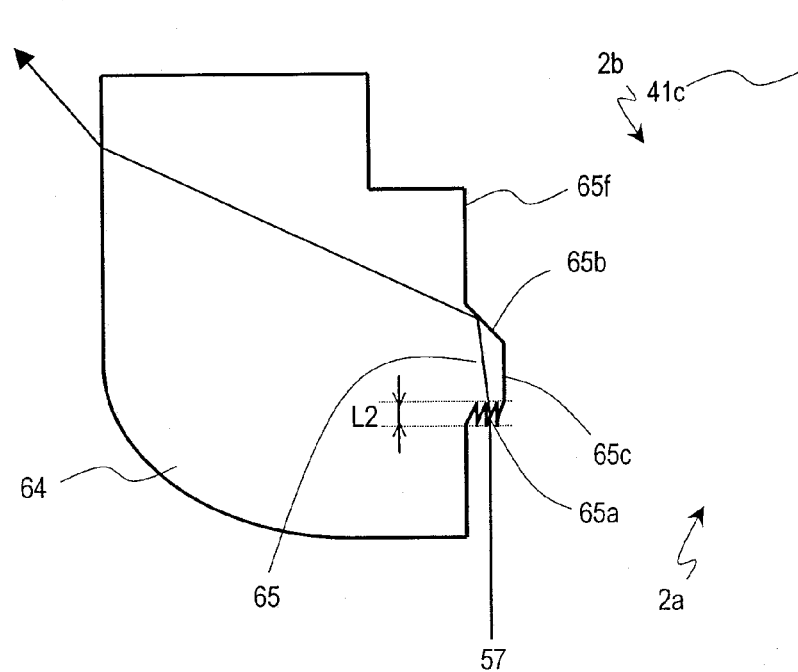
FIG. 7B is a cross-sectional view showing still another embodiment of the opening limiting section of the lens holder.

As shown in FIG. 7B, an opening limiting section 65 provided in a lens holder 64 includes a ring-shaped diffraction grating 65a provided to face the first opening 2b, a second ring-shaped inclined surface 65b, and a side surface 65c. The ring-shaped diffraction grating 65a can refract the light incident on the opening limiting section 65 in a direction away from the optical axis 41c. The diffraction grating 65a can set the diffraction direction of light by a convex and concave pattern thereof. Length L2 necessary to provide the diffraction grating 65a on an inner surface 65f can be shorter than the length necessary for forming the first ring-shaped inclined surface. Accordingly, the length of the lens holder 64 in the direction of the through-hole can be decreased. This is suitable to realize a thin optical information apparatus.

Figure 7C:
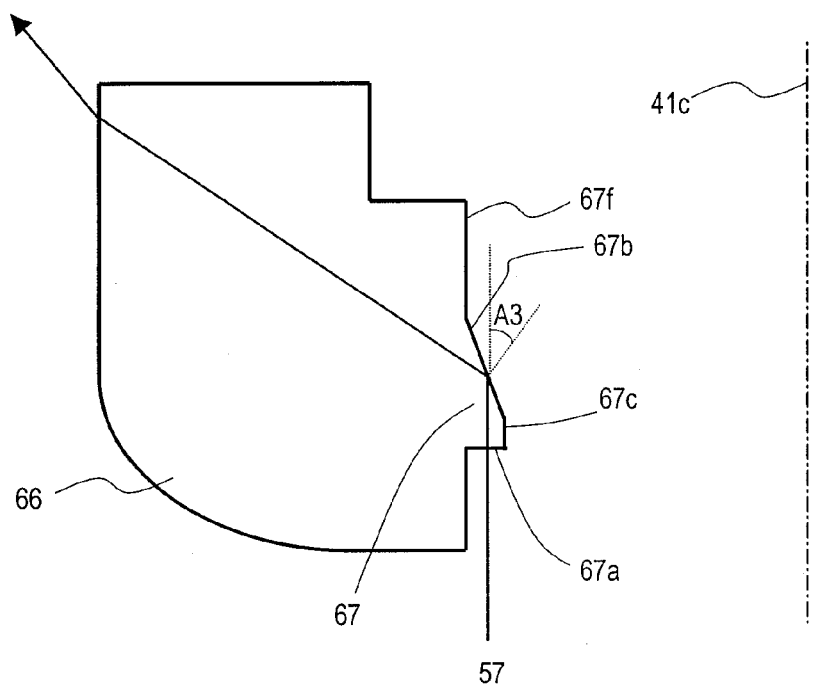
FIG. 7C is a cross-sectional view showing still another embodiment of the opening limiting section of the lens holder.

The opening limiting section 3 shown in FIG. 5 has the first ring-shaped inclined surface 3a and the second ring-shaped inclined surface 3b, but the opening limiting section 3 may include either one of the ring-shaped inclined surfaces. As shown in FIG. 7C, an opening limiting section 67 provided in a lens holder 66 includes a vertical surface 67a, a second ring-shaped inclined surface 67b, and a side surface 67c. The vertical surface 67a is vertical to an inner surface 67f, and does not refract the light incident thereon. However, by decreasing the inclining angle of the second ring-shaped inclined surface 67b with respect to the inner surface 67f, the light 57 can be refracted by the second ring-shaped inclined surface 67b to be away from the optical axis 41c.

As shown in FIG. 7C, an angle made by the direction in which the light 57 is incident on the second ring-shaped inclined surface 67b and the normal to the second ring-shaped inclined surface 67b is set to A3. As long as angle A3 fulfills expression (5), the light 57 is totally reflected by the second ring-shaped inclined surface 67b and thus can be prevented from being incident on the objective lens 41.

$$n \cdot \sin(A3) > 1 \tag{5}$$

Figure 7D:
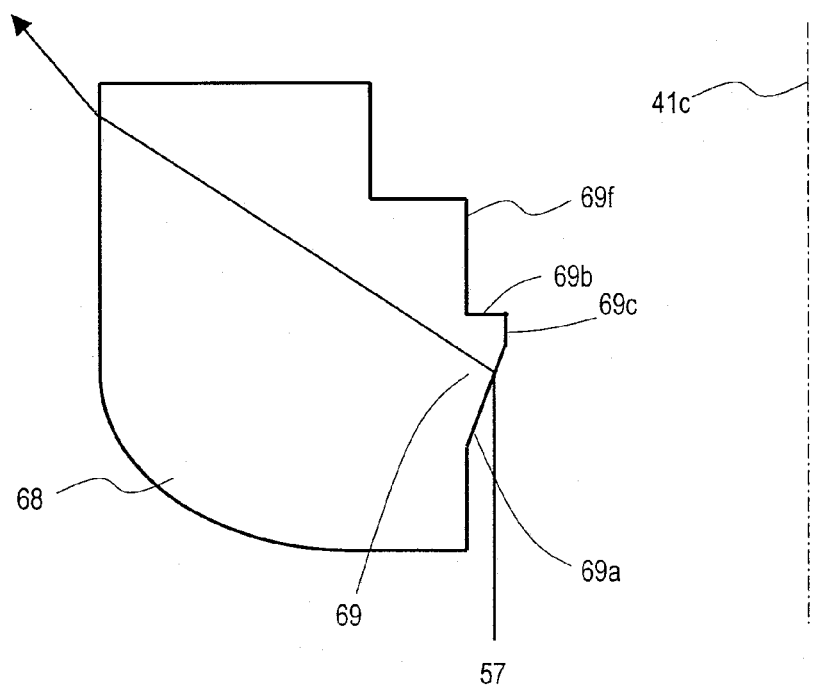
FIG. 7D is a cross-sectional view showing still another embodiment of the opening limiting section of the lens holder.

As shown in FIG. 7D, an opening limiting section 69 provided in a lens holder 68 includes a first ring-shaped inclined surface 69a, a vertical surface 69b, and a side surface 69c. The opening limiting section 69 can refract the light 57 by the first ring-shaped inclined surface 69a in a direction away from the optical axis 41c.

Figure 7E:
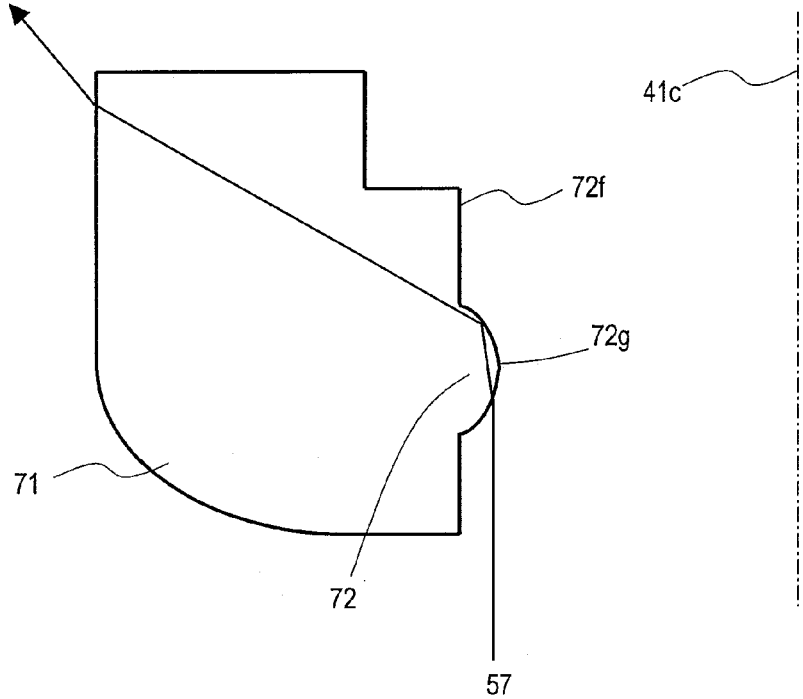
FIG. 7E is a cross-sectional view showing still another embodiment of the opening limiting section of the lens holder.

The cross-section of the opening limiting section may be curved. As shown in FIG. 7E, an opening limiting section 72 provided in a lens holder 71 has a cross-section, taken along the central axis of the through-hole, which has a shape of a part of an ellipse projecting toward the central axis. The opening limiting section 72 having such a cross-section also can refract the light 57 in a direction away from the optical axis 41c. The lens holder 71 having such a shape can be easily molded by a method such as injection molding or the like, and thus can reduce the production cost of the lens holder 71.

Figure 7F:
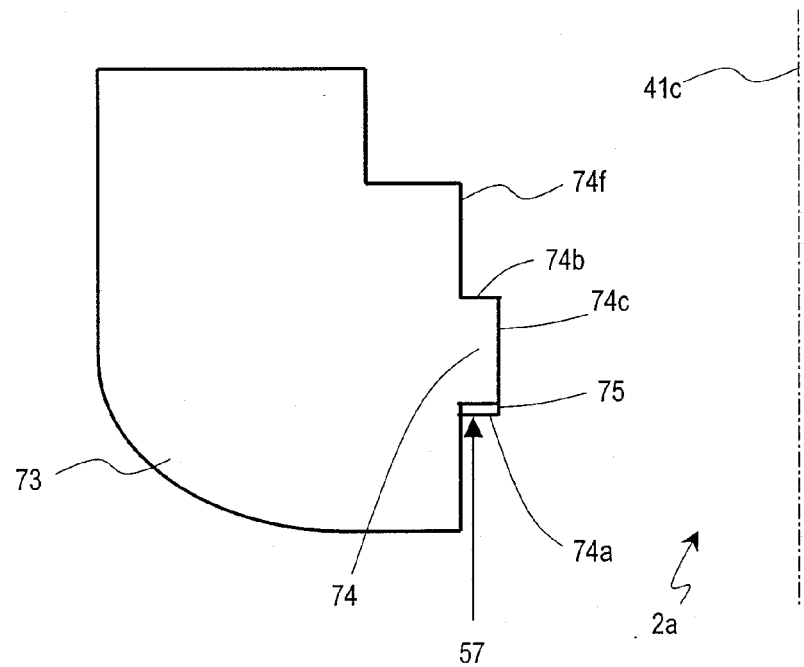
FIG. 7F is a cross-sectional view showing still another embodiment of the opening limiting section of the lens holder.

The opening limiting sections described above have a structure which can be formed integrally with the lens holder 71, and can be produced at low cost. For shielding the light more certainly, a light shielding surface may be provided in the opening limiting section. As shown in FIG. 7F, an opening limiting section 74 provided in a lens holder 73 includes a ring-shaped projection including generally vertical surfaces 74a and 74b and a side surface 74c. The ring-shaped projection projects from an inner surface 74f toward the optical axis 41c. On the surface 74a facing the first opening 2b, a ring-shaped shielding surface 75 is provided. The shielding surface 75 may be one surface of a ring-shaped sheet formed of a resin containing a black coating material or graphite, or a colored resin, for example. Alternatively, the entire opening limiting section may be formed of a resin containing a black coating material or graphite, or a colored resin. Instead of the shielding surface 75 for shielding the light, a scattering surface for scattering the light may be provided.

Such a surface is formed of a different material from that of the lens holder 2 and so the production cost is slightly raised, but can shield unnecessary light with a higher level of certainty because the effect of shielding the light is high.

In this embodiment, the lens unit includes a lens holder and an objective lens. The lens unit may include other optical elements.

Figure 7G:
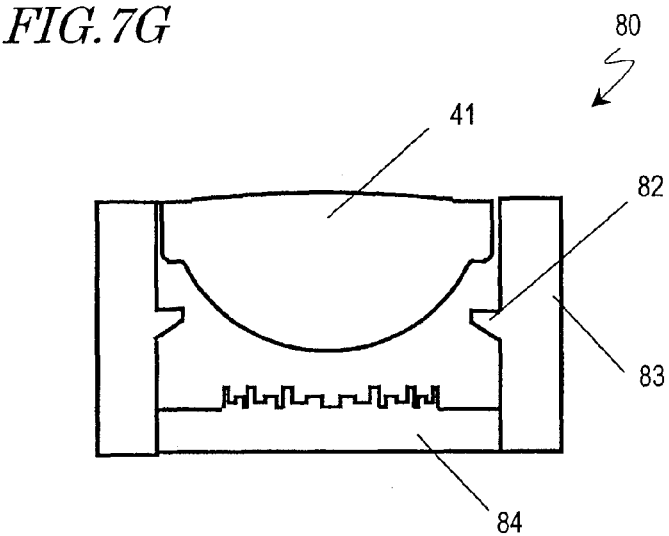
FIG. 7G is a cross-sectional view showing another embodiment of the lens unit.

For example, as shown in FIG. 7G, a lens unit 80 includes the objective lens 41, a lens holder 83, an opening limiting section 82 provided in the lens holder, and an optical element 84.

The opening limiting section 82 may have any of the various structures described above. As the optical element 84, any of various optical elements such as a diffractive lens is usable. Since the lens holder 83 transmits ultraviolet, the lens holder 83 and the optical element 84 can be bonded together with an ultraviolet-curable resin. After the objective lens 41, the opening limiting section 82 and the optical element 84 are appropriately adjusted in terms of inclination and position, ultraviolet is radiated thereto to fix the optical element 84 to the lens holder 83. Thus, an optical unit having an adjusted optical axis can be obtained.

Now, with reference to FIGS. 1 and 2, designing of the optical system according to this embodiment will be described. The optical pickup 101 is compatible to three optical discs 32, 35 and 46 having different recording densities. The optical discs 32, 35 and 46 are, for example, a DVD, a BD and a CD.

For performing a recording or reproduction operation on or from a plurality of optical discs having different recording densities, the required control precision varies. In general, for performing a recording or reproduction operation on or from an optical disc having a low recording density, a high level of control precision is not required. However, due to the low recording density, the objective lens is required to move in a large area. By contrast, for performing a recording or reproduction operation on or from an optical disc having a high recording density, a high control precision is required, but the area in which the objective lens moves may be small. For example, between a BD having a high recording density and a CD having a low recording density, the recording density is different by about 40 times and therefore the required control precision and the required moving area of the objective lens are also significantly different.

Figure 8:
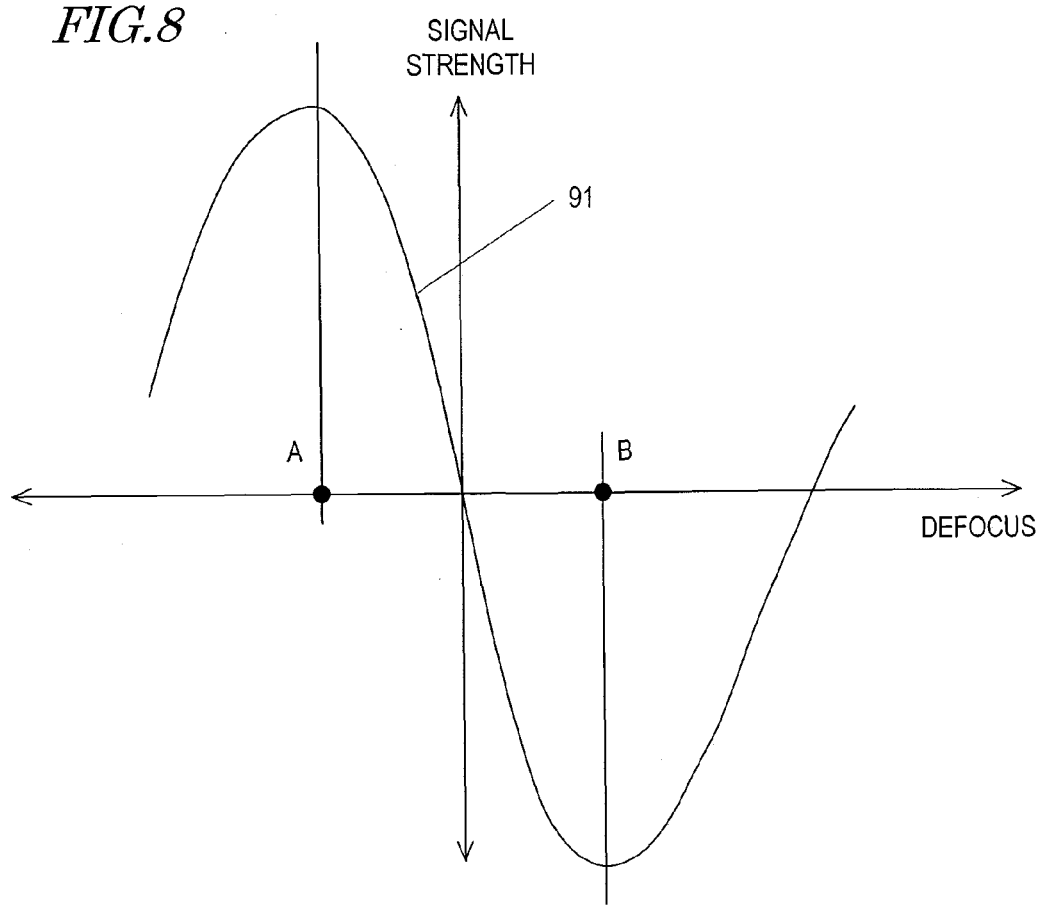
FIG. 8 shows an example of a focusing error signal.

For the above-described reasons, when a disc having a low recording density is mounted on an optical information apparatus which tolerates a relatively large shape distortion and is rotated by a spindle motor, the position of the recording face is changed up and down due to the distortion of the shape of the disc. Namely, a "face shake" occurs. In order to start focusing control with certainty for a disc with a large face shake, the dynamic range of a focusing error signal needs to be large. Specifically, as shown in FIG. 8, it is desirable that the interval between defocus point A at which the focusing error signal has the maximum strength, and focus point B at which the focusing error signal has the minimum strength, is large.

By contrast, with an optical disc having a high recording density, the optical spot formed on the recording face thereof is small and the focal depth thereof is shallow. Hence, focusing control needs to be performed more precisely. The interval between defocus point A and the focus point B in FIG. 8 needs to be small and the detection sensitivity between points A and B needs to be high.

In this embodiment, in order to address these issues, an optical system for each optical disc is designed as follows.

Specifically, optical systems for transmitting the light beams 56, 57 and 58 are designed such that the defocusing detection range of a focusing error signal, obtained by directing the light beam 57 or the light beam 58 having a longer wavelength than the light beam 56 toward the optical disc and detecting the reflected light by a light detector, is larger than the defocusing detection range of a focusing error signal, obtained by directing the light beam 56 toward the optical disc and detecting the reflected light by a light detector.

Preferably, focal length f1 of the objective lens is set to 1 mm to 1.8 mm, and focal length fC1 of the collimator lens 33 is set to 14 mm to 30 mm. Focal length f2 of the objective lens 41 is set to 2 mm to 3 mm, and focal length fC2 of the collimator lens 39 is set to 10 mm to 20 mm.

Furthermore, within these ranges, a first magnification obtained by dividing focal length fC1 of the collimator lens 33 by focal length f1 of the objective lens 34 is set to be larger than a second magnification obtained by dividing focal length fC2 of the collimator lens 39 by focal length of the objective lens 41. Namely, the focal lengths are set to fulfill the relationship of expression (6).

$$fC1/f1 > fC2/f2 \qquad (6)$$

In order to fulfill the relationship of expression (6), it is preferable that focal length f2 of the objective lens 41 is made longer than focal length f1 of the objective lens 34, or that focal length Cf2 of the collimator lens 39 is made shorter than focal length fC1 of the collimator lens 33.

By selecting the focal lengths of the objective lenses 34 and 41 and the collimator lenses 33 and 39 in this manner, the following is made possible. For performing recording or reproduction on or from the optical disc 35 having a high recording density, highly precise focusing control is realized. For performing recording or reproduction on or from the optical disc 32 or 46 having a low recording density, the defocusing detection sensitivity can be reduced and the defocusing detection area can be enlarged. Therefore, even when the face shake of the rotating optical disc is large, focusing control can be started with certainty.

Especially, a relay lens 44 may be given a convex lens function. In this case, the angle at which the light source 43a is grasped through the opening of the objective lens 41, i.e., the light source numerical aperture (NA) may be converted from a large value obtained in the vicinity of the light source into a small value obtained in the vicinity of the collimator lens 39. In this way, the magnitude obtained with the infrared light having the longest wavelength in this embodiment is minimized. As a result, the effect of reducing the defocusing detection sensitivity and maximizing the defocusing detection range is provided.

Figure 9:
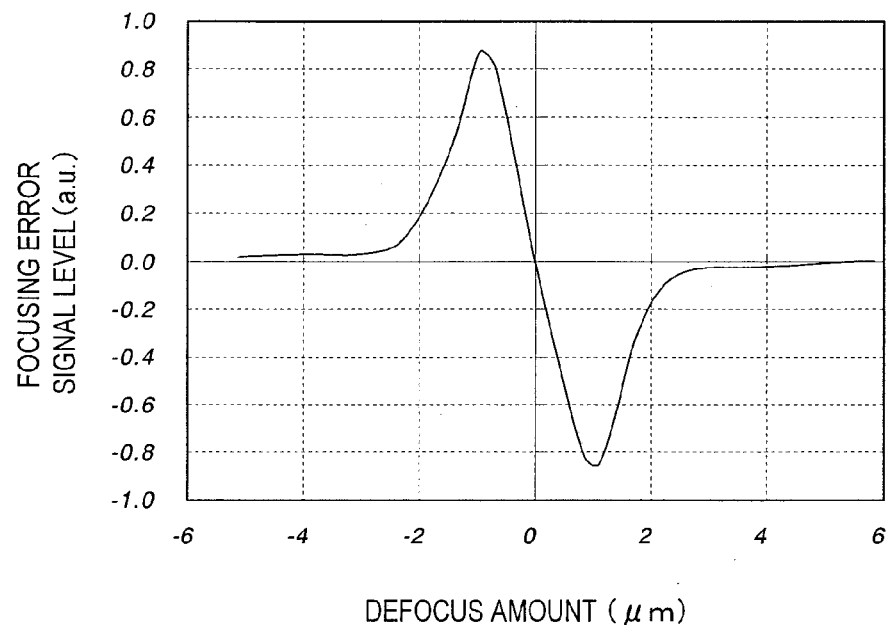
FIG. 9 shows a focusing error signal obtained from an optical system for a BD in Embodiment 1.
Figure 10:
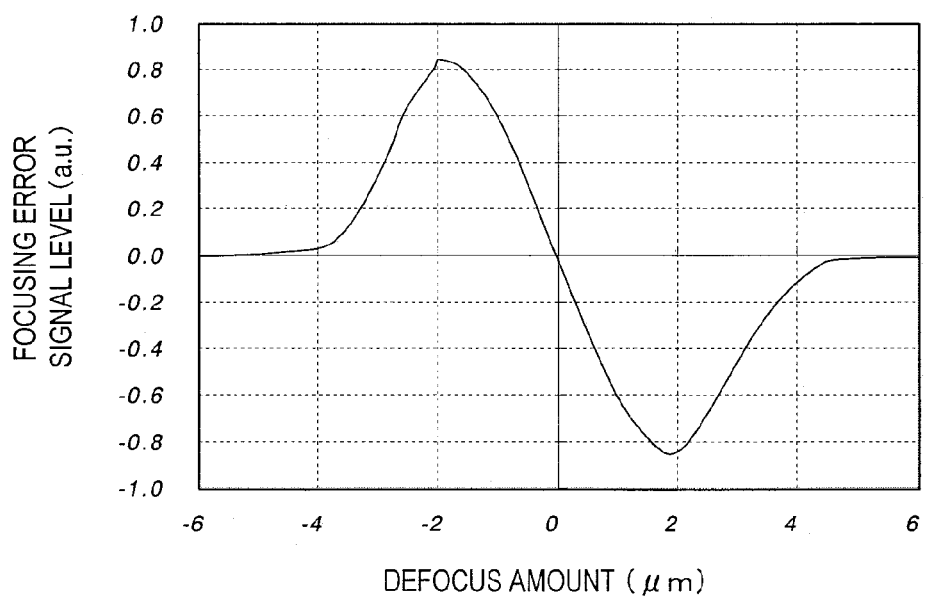
FIG. 10 shows a focusing error signal obtained from an optical system for a DVD in Embodiment 1.
Figure 11:
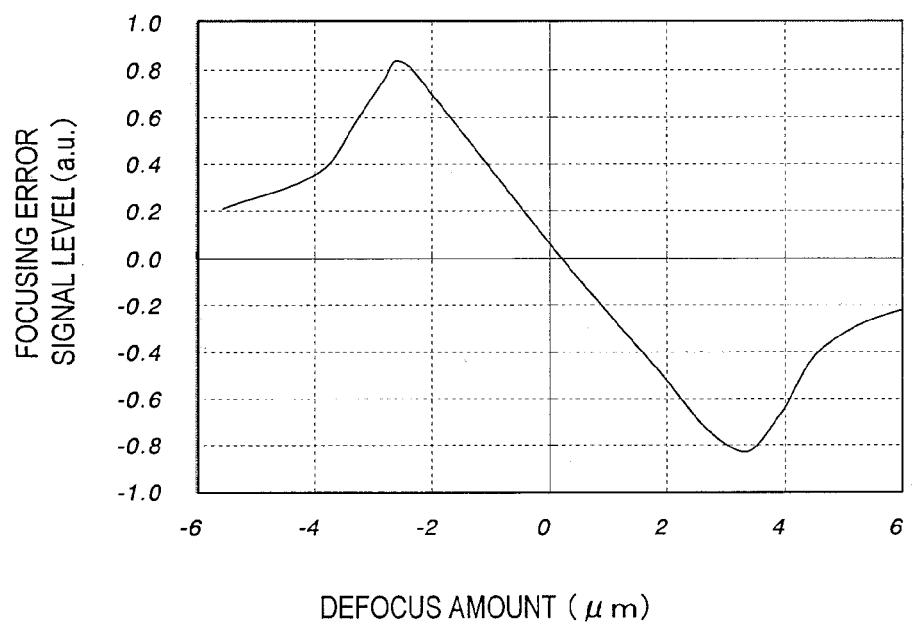
FIG. 11 shows a focusing error signal obtained from an optical system for a CD in Embodiment 1.

A focusing error signal obtained by an optical pickup including the optical systems designed in this manner will be schematically described below. FIG. 9 shows a focusing error signal obtained by directing blue light from the light source 31 toward a BD. FIG. 10 shows a focusing error signal obtained by directing red light from the light source 37a toward a DVD. FIG. 11 shows a focusing error signal obtained by directing infrared light from the light source 43a toward a CD.

In FIGS. 9 through 11, the horizontal axis represents the defocus amount, i.e., the distance between the recording face and the convergence spot in the direction of the optical axis (focusing direction), and the vertical axis represents the strength of the focusing error signal.

As shown in FIG. 9, regarding the focusing error signal for the BD, the dynamic range, namely, the interval between the defocus amounts at which the strength of the focusing error signal is maximized and minimized is set to about 2 μm. As shown in FIG. 10, regarding the focusing error signal for the DVD, the dynamic range, namely, the interval between the defocus amounts at which the strength of the focusing error signal is maximized and minimized is set to about 4 μm.

Such settings are realized by setting the relationship of the focal lengths of the objective lens and the collimator lens, i.e., the magnification. With such settings, a highly sensitive focusing error signal for the BD is obtained and highly precise focusing control can be performed.

At this point, as shown in FIG. 11, regarding the focusing error signal for the CD, the dynamic range, namely, the interval between the defocus amounts at which the strength of the focusing error signal is maximized and minimized, i.e., the defocusing detection range is about 6 μm. This is an effect obtained by reducing the magnification from that of the DVD by the relay lens. In this way, even for a CD having a large face shake, focusing control can be started with stably.

Alternatively, the optical system may be designed such that the focal length of the objective lens 41 for infrared light is longer than the focal length of the objective lens 41 for red light. In this case also, the effect of reducing the defocusing detection sensitivity and enlarging the defocusing detection range can be obtained.

Embodiment 2

In an optical pickup including a plurality of objective lenses, a plurality of through-holes through which an optical beam passes needs to be formed in the lens holder. Especially for performing recording or reproduction on or from an optical disc having a high recording density, an objective lens having a larger numerical aperture needs to be used. Accordingly, the corresponding through-hole needs to be larger. Due to the large through-hole, such a lens holder has a decreased rigidity and thus is likely to be resonated at a predetermined frequency. The optical pickup according to this embodiment includes an objective lens driving device having a structure for suppressing the deterioration in servo performance, which would be otherwise caused by resonance of the lens holder.

Figure 12:
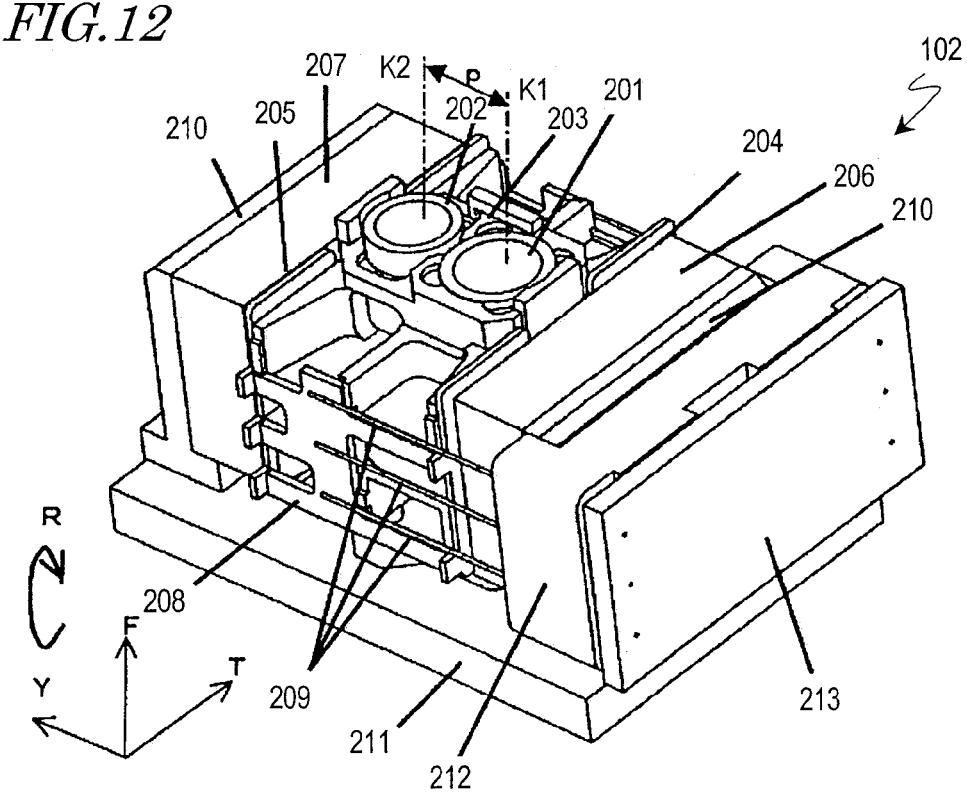
FIG. 12 is an isometric view showing an objective lens driving device according to Embodiment 2.
Figure 13:
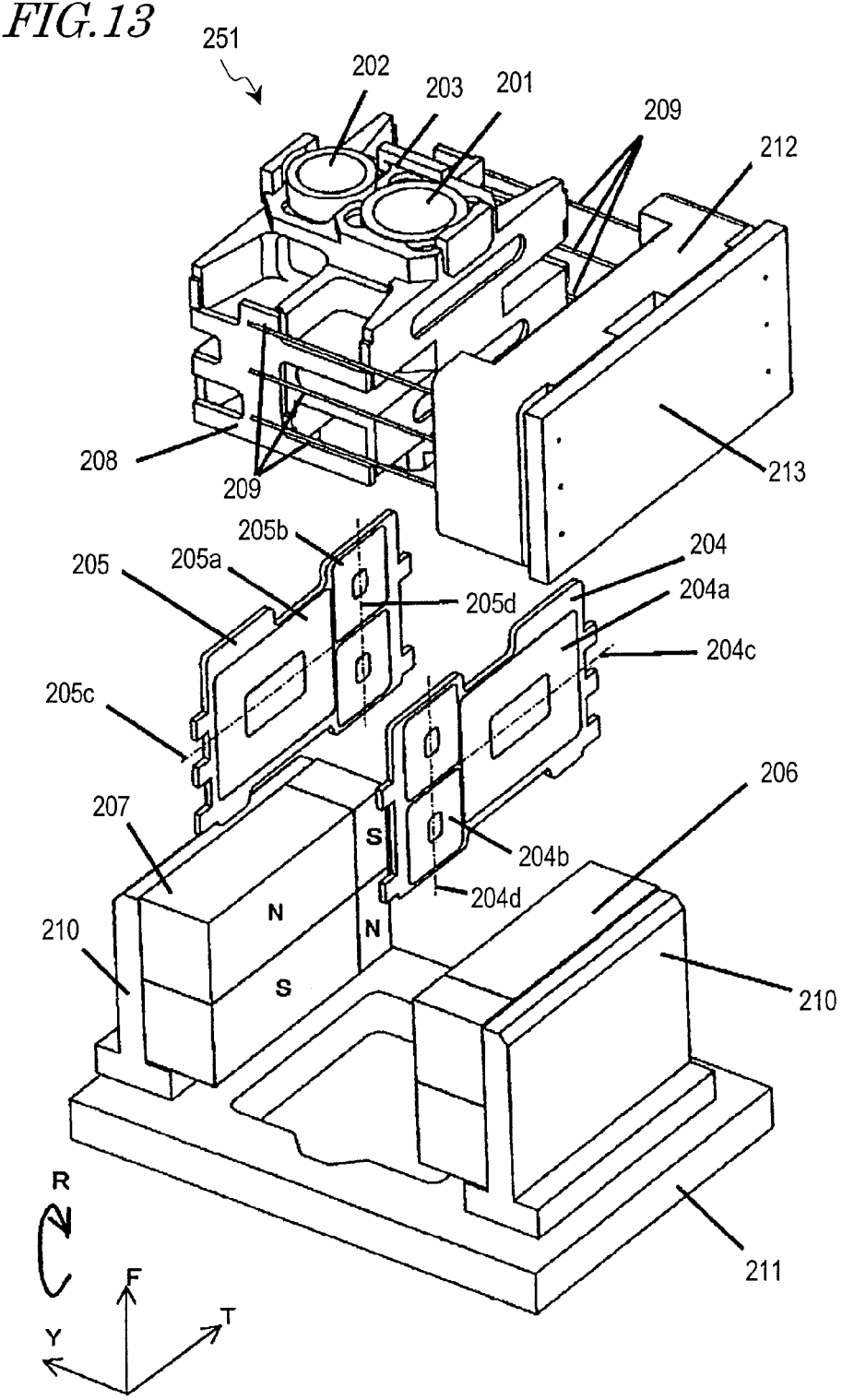
FIG. 13 is an exploded isometric view showing the objective lens driving device according to Embodiment 2.

FIGS. 12 and 13 are respectively an isometric view and an exploded isometric view of an objective lens driving device of an optical pickup according to this embodiment. Like in Embodiment 1, arrows F, T and Y respectively represent a focusing direction, a tracking direction and a tangential direction of an optical disc (not shown). Arrow R represents a tilt direction, which is a rotation direction around the Y axis. The focusing direction F, the tracking direction T, and the direction Y cross one another perpendicularly, and respectively correspond to the directions of coordinate axes of a three-dimensional Cartesian coordinate system.

An objective lens driving device 102 according to this embodiment includes a movable body 251. The movable body 251 includes an objective lens 201, an objective lens 202, a lens holder 203, a first print coil 204, a second print coil 205, and terminal plates 208.

The lens holder 203 is formed of a resin or the like, and supports the objective lenses 201 and 202. The objective lens 201 is used to perform recording or reproduction on or from an optical disc having a low recording density such as a CD, a DVD or the like. The objective lens 202 is used to perform recording or reproduction on or from an optical disc having a high recording density such as a BD or the like. On two side surfaces of the lens holder 203 parallel to the direction T, the first print coil 204 and the second print coil 205 are attached. On two side surfaces of the lens holder 203 parallel to the tracking direction Y, the terminal plates 208 are attached.

The first print coil 204 and the second print coil 205 each have a coil structure provided by attaching a conductive member to a respective substrate in a spiral manner around an axis parallel to the direction Y.

In the first print coil 204, a first focusing coil section 204a and a first tracking coil section 204b are arranged in the tracking direction T. In the second print coil 205, a second focusing coil section 205a and a second tracking coil section 205b are arranged in the tracking direction T.

The first focusing coil section 204a and the second focusing coil section 205a are located at positions shifted in opposite directions to each other by an equal distance with respect to a plane which includes the direction Y and is vertical to the tracking direction T. Furthermore, the first focusing coil section 204a and the second focusing coil section 205a are distanced from each other in the direction Y. The first tracking coil section 204b and the second tracking coil section 205b are located in substantially the same relationship. The first print coil 204 and the second print coil 205 can fulfill the above relationship by including the same components and by being located at positions rotationally symmetric with respect to the direction Y.

Both of two terminals of the first focusing coil section 204a and both of two terminals of the second focusing coil section 205a are independently connected to a control circuit (not shown) via the terminal plates 208 and wires 209. The first tracking coil section 204b and the second tracking coil section 205b are connected to each other in series and connected to the control circuit via the terminal plates 208 and the wires 209.

The optical pickup 102 further includes a first magnet 206 and a second magnet 207 for driving the movable body 251. The first magnet 206 and the second magnet 207 each include four areas, divided by two lines in the focusing direction F and the tracking direction T used as borders. Each two areas adjacent to each other along each border are magnetized with different polarities.

The first magnet 206 is located to face the first print coil 204 at a position at which a central line 204c of the focusing coil section 204a of the first print coil 204 and a central line 204d of the tracking coil section 204b of the first print coil 204 match the borders dividing the four areas, and is secured to a yoke 210. Similarly, the second magnet 207 is located to face the second print coil 205 at a position at which a central line 205c of the focusing coil section 205a of the second print coil 205 and a central line 205d of the tracking coil section 205b of the second print coil 205 match the borders dividing the four areas, and is secured to another yoke 210.

The first magnet 206 and the second magnet 207 are preferably the same in all of the material, shape, magnetization pattern and magnetization strength, and the magnetic fields generated by the first magnet 206 and the second magnet 207 are generally the same.

The two terminals of the first focusing coil section 204a, the two terminals of the second focusing coil section 205a, and two terminal of the assembly of the tracking coil 204b and the tracking coil 205b connected in series, i.e., six terminals in total, are connected to tips of the six wires 209 via the terminal plates 208. Bases of the wires 209 are secured to a substrate 213 via a suspension holder 212. The yoke 210, the suspension holder 212 and the substrate 213 are secured to a base 211. The wires 209 are formed of an elastic metal material such as beryllium copper, bronze or the like, and wires or rods having, for example, a circular, polygonal or elliptical cross-section are used as the wires 209. The support center of the wires 209 is set to generally match the center of gravity of the movable body.

The objective lenses 201 and 202 are arranged on the lens holder 203 in the direction Y. The objective lens 201 is located on the base side of the wires 209 with respect to the support center of the wires 209, and the objective lens 202 is located on the tip side of the wires 209 with respect to the support center of the wires 209.

The first print coil 204 and the first magnet 206 are located on the base side of the wires 209, and the second print coil 205 and the second magnet 207 are located on the tip side of the wires 209. Namely, the first print coil 204 and the first magnet 206 are located on the side of the objective lens 201 in the direction Y, and the second print coil 205 and the second magnet 207 are located on the side of the objective lens 202 in the direction Y.

Figure 14:
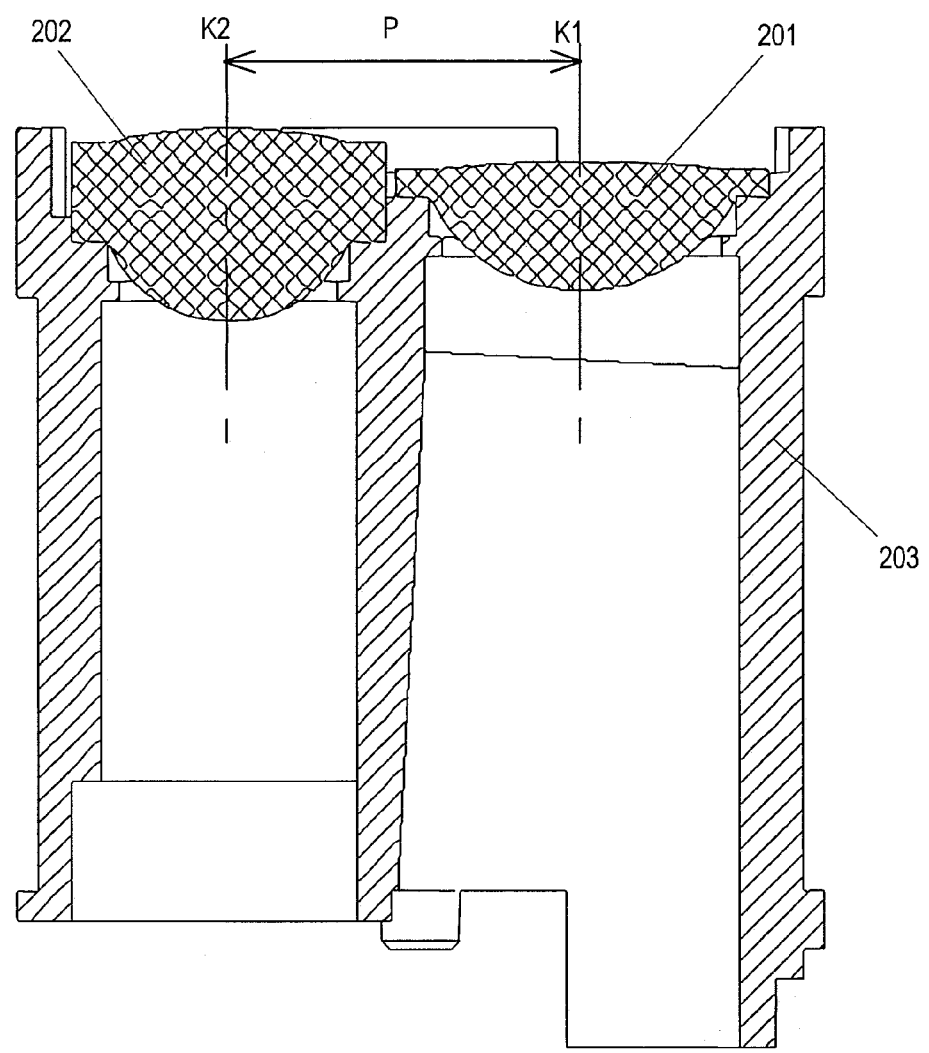
FIG. 14 is a cross-sectional view of a lens holder of the objective lens driving device shown in FIG. 12.

FIG. 14 shows a cross-section of the lens holder 203 taken along a plane parallel to the direction Y. The objective lenses 201 and 202 respectively have optical axes K1 and K2. In the lens holder 203, through-holes are located at positions corresponding to the objective lenses 201 and 202, along the optical axes K1 and K2. The through-holes are each provided for obtaining an optical path of a light beam to be transmitted through the respective objective lens.

The present inventor conducted various examinations on the rigidity and resonance of the lens holder. As a result, it was found that as the through-hole formed in the lens holder is enlarged, the rigidity of the lens holder may be reduced, but an important cause of deterioration in servo performance is the resonant frequency. It was found that the resonant frequency varies depending on distance p between the optical axes K1 and K2, and the deterioration in servo performance can be suppressed by setting distance p at an appropriate value.

Figure 15:
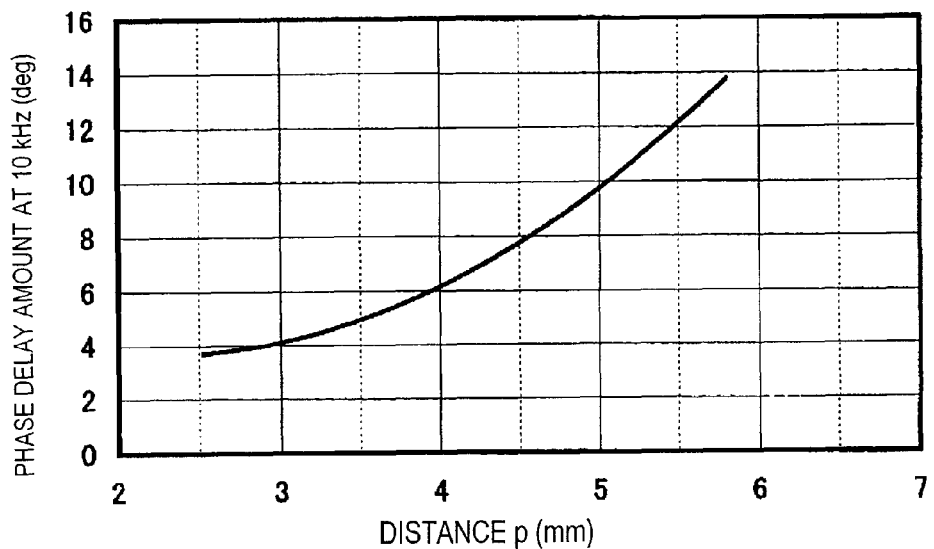
FIG. 15 shows the relationship of the distance between optical axes vs. and the phase delay amount of servo control.

FIG. 15 shows the relationship of distance p between the optical axes K1 and K2 vs. the phase delay amount caused to servo control by the resonance. As shown in FIG. 15, as the distance is shorter, the delay amount is smaller. It may be considered that when distance p is shortened, the rigidity of the lens holder is decreased and so the adverse affect by the resonance is increased. However, the phase delay is not caused by the rigidity decrease itself but depends on the resonant frequency.

As long as the phase delay amount is 10 degrees or less, the servo control characteristic is not significantly deteriorated and the control does not become unstable. Accordingly, as shown in FIG. 15, it is preferable that distance p between the optical axes K1 and K2 is set to 5 mm or less. Where distance p is set to 5 mm or less, generation of a phase delay in the servo control, which would be otherwise caused by resonance, is suppressed, and thus the phase delay amount can be decreased.

The effect of suppressing the adverse affect caused by resonance is provided as long as distance p is 5 mm or less. A preferable lower limit of distance p depends on the diameters of the objective lenses 201 and 202.

The light beam is emitted from an optical block (not shown) located below the base 211 shown in FIG. 13. The shift of the optical axis of the light beam from the optical axis of the objective lens generally needs to be 10% or less of the diameter in order to suppress the deterioration in the recording or reproduction signal. A preferable distance by which the objective lens moves in the tracking direction to follow the track of the optical disc is 0.2 mm. From these points, the effective diameter of the objective lens is preferably about 2 mm. Around the objective lens, a flat section having a width of at least 0.2 mm for positioning needs to be provided. An interval of at least 0.1 mm is necessary between the two objective lenses for the designing reasons.

Based on these factors, distance p is preferably 2.5 mm or greater. Namely, distance p is preferably 2.5 mm or greater and 5 mm or less. More preferably, distance p is 3.4 mm or greater and 3.8 mm or less. Where distance p is set in this range, the phase shift amount of servo control by resonance is about 5 degrees and a characteristic equivalent to that without resonance can be obtained.

The objective lens driving device operates as follows. When an electric current flows to the focusing coil section 204a of the first print coil 204 and the focusing coil section 205a of the first print coil 205, an electromagnetic force is generated between the first magnet 206 and the second magnet 207. Then, the objective lens is driven in the focusing direction F.

Figure 16:
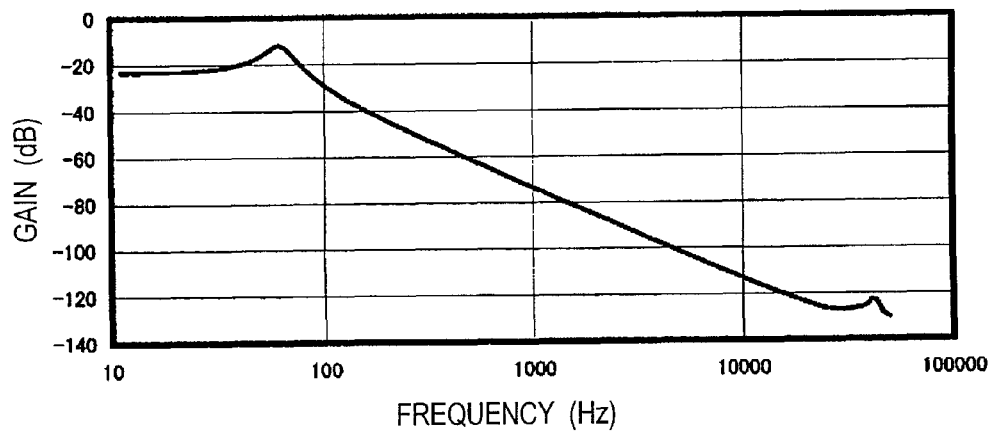
FIG. 16 shows a displacement frequency response characteristic in a focusing direction of the lens holder to the value of current flowing in a focusing coil in Embodiment 2.
Figure 17:
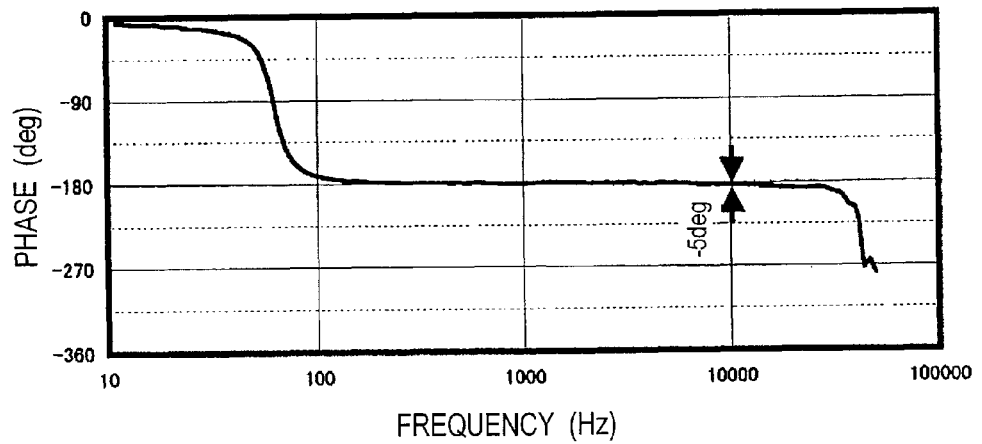
FIG. 17 shows a displacement frequency response characteristic in a focusing direction of the lens holder to the phase delay amount of servo control in Embodiment 2.

FIG. 16 shows the displacement frequency response characteristic in the focusing direction F of the lens holder 203 to the value of current flowing to the focusing coil 204a. FIG. 17 shows the displacement frequency response characteristic in the focusing direction F of the lens holder 203 to the phase delay amount of servo control. As shown in FIG. 16, as the displacement frequency is increased, the current value decreases, but almost no disturbance is occurred by the frequency. As shown in FIG. 17, the phase delay amount is 5 degrees or less over a range of about several hundred hertz to 10000 Hz, which means almost no phase delay occurs. This indicates that the phase delay does not occur in the focusing control and a superb control is realized. This also indicates that the control does not become unstable due to the phase delay and a stable control is realized.

Figure 18:
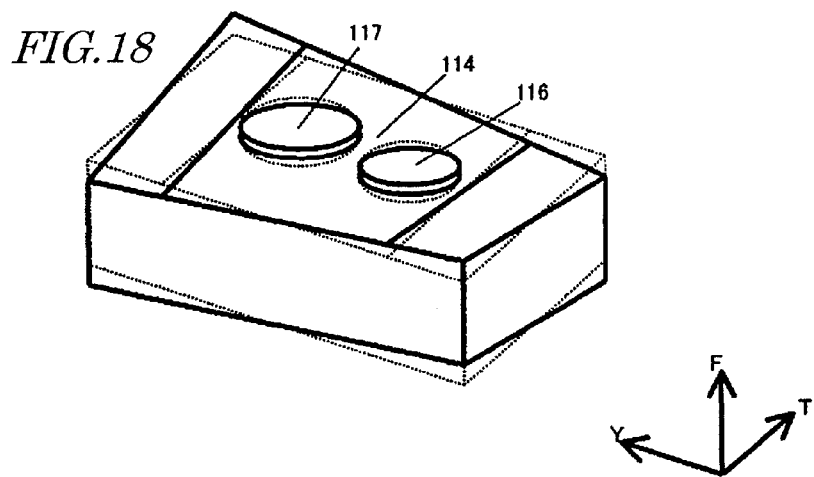
FIG. 18 is a schematic view showing resonance of a conventional lens holder.
Figure 19:
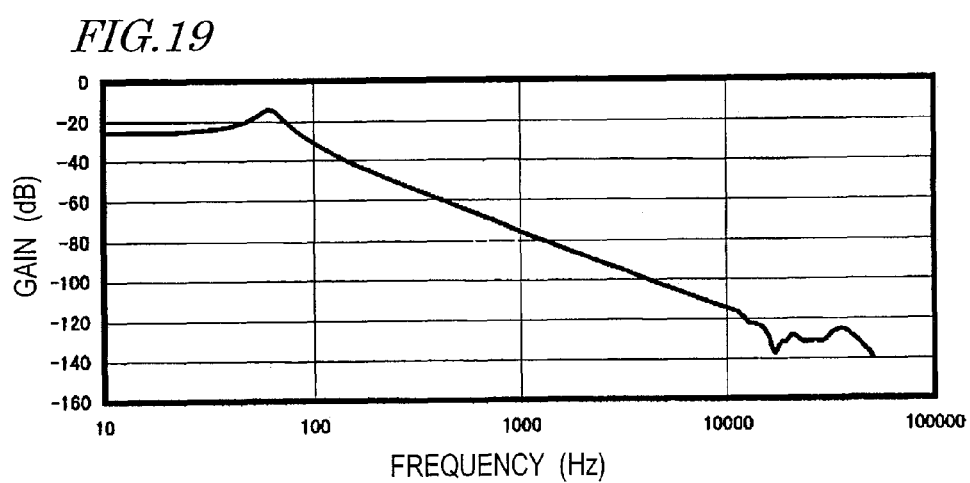
FIG. 19 shows a displacement frequency response characteristic in a focusing direction of the lens holder to the level of current flowing in a focusing coil in a conventional objective lens driving device.
Figure 20:
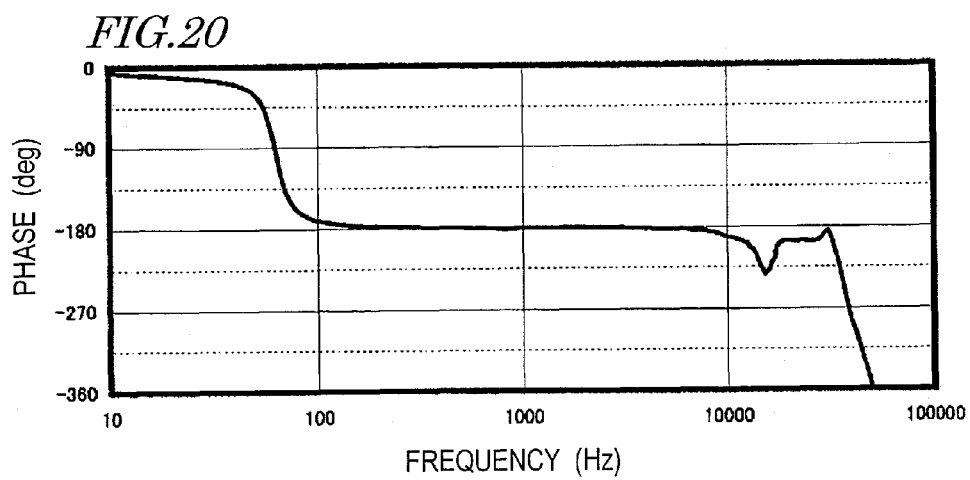
FIG. 20 shows a displacement frequency response characteristic in a focusing direction of the lens holder to the phase delay amount of servo control in the conventional objective lens driving device.

FIG. 18 schematically shows that resonance is generated in a conventional lens holder 114 including objective lenses 116 and 117. In the conventional objective lens driving device, the distance between the two objective lenses is about 6 mm. FIGS. 19 and 20 respectively show the displacement frequency response characteristic in the focusing direction F of the lens holder to the current value, and the displacement frequency response characteristic in the focusing direction F of the lens holder to the phase delay amount of servo control, both in the conventional objective lens driving device. As shown in FIG. 19, the current value is rapidly decreased at several tens of thousand hertz. This is an influence of the resonance of the lens holder. As shown in FIG. 20, the phase delay amount is increased due to the resonance in the vicinity of several tens of thousand hertz. Due to the influence thereof, the phase delay amount is increased also in the vicinity of 10000 Hz.

As can be understood, according to this embodiment, the resonant frequency of the lens holder can be appropriately controlled and also the phase delay amount of servo control can be decreased by decreasing the distance between two objective lenses. The objective lens driving device according to this embodiment is capable of realizing a highly precise and stable servo control.

The objective lens driving device according to this embodiment is preferably usable in the optical pickup in Embodiment 1 as the objective lens driving device 45. This realizes an optical pickup providing the effects of this embodiment in addition to the effects of Embodiment 1.

Embodiment 3

In this embodiment, an objective lens driving device having a structure preferable for realizing the distance between two objective lenses described in Embodiment 2 will be described.

Figure 21:
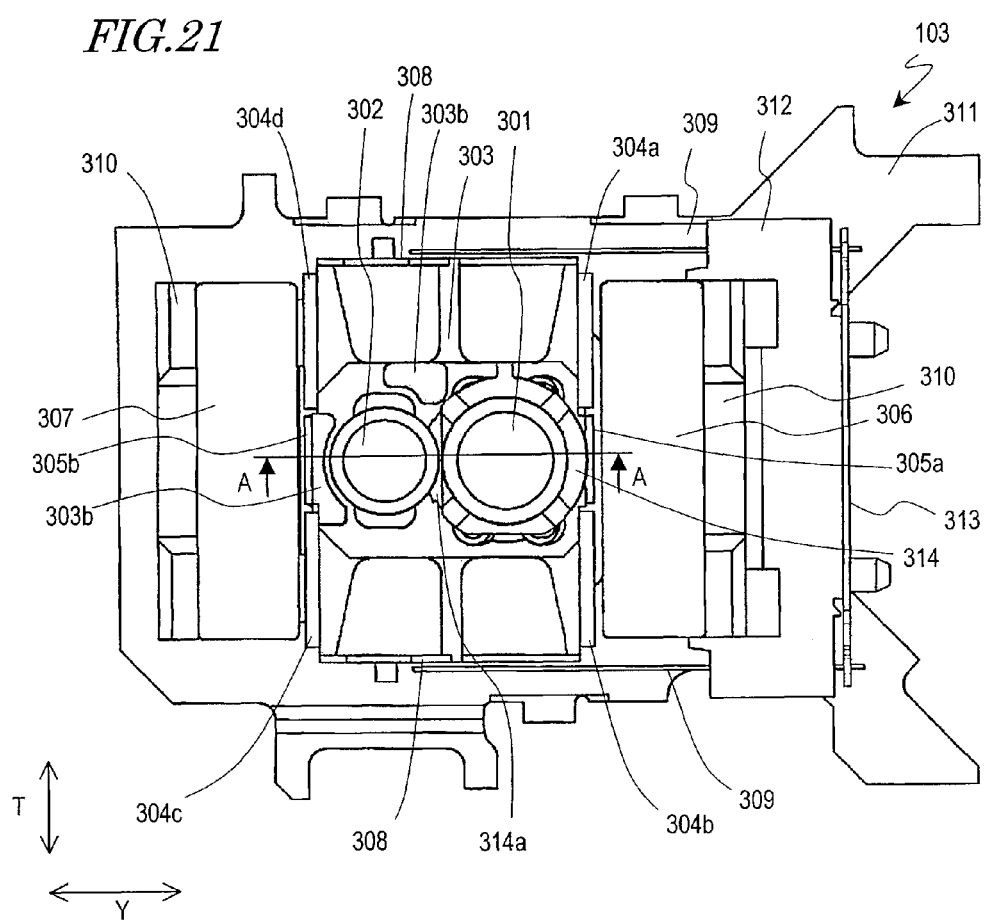
FIG. 21 is a plan view showing a structure of an objective lens driving device according to Embodiment 3.
Figure 22:
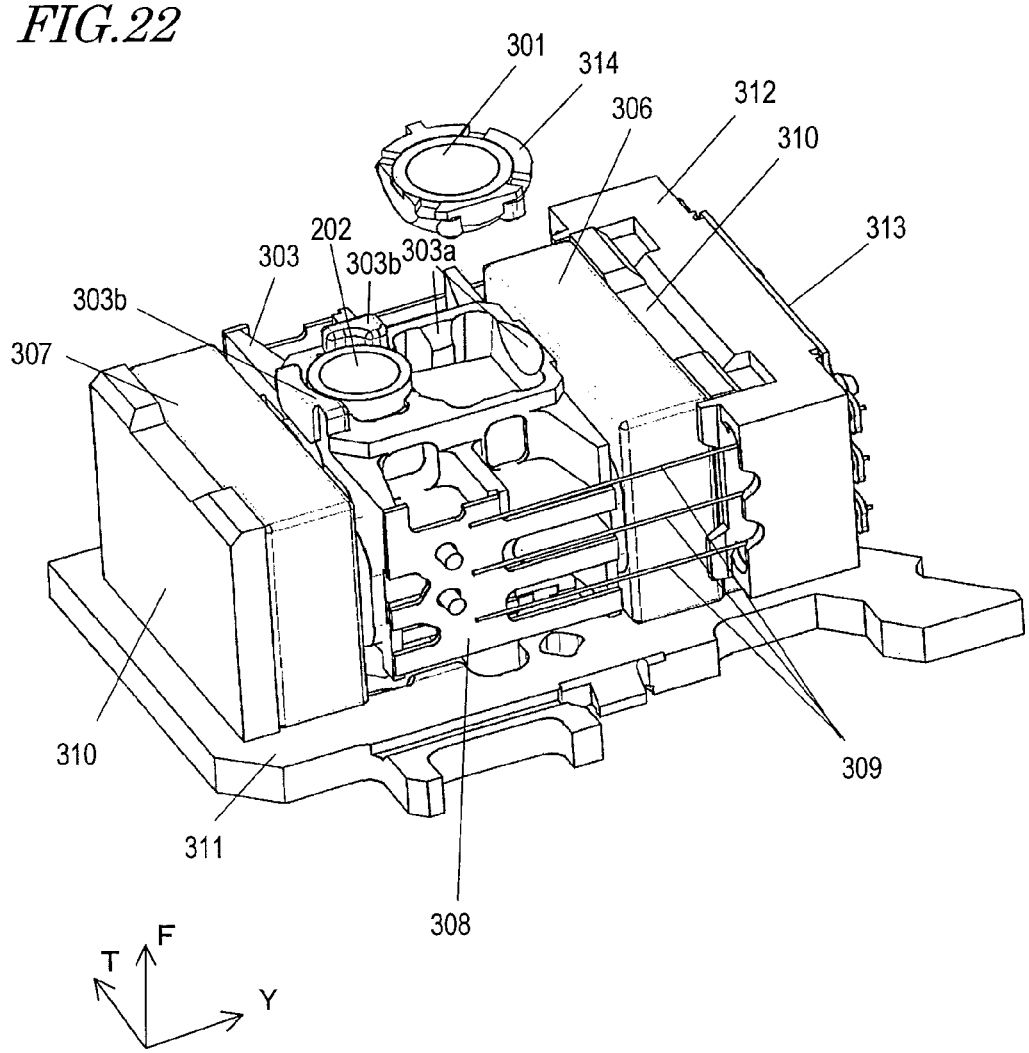
FIG. 22 is an exploded isometric view showing the structure of the objective lens driving device according to Embodiment 3.

FIGS. 21 and 22 are respectively a plan view and an exploded isometric view showing a structure of an objective lens driving device 103 according to this embodiment. In FIGS. 21 and 22, directions T, Y and F represent the focusing direction, the tracking direction, and the tangential direction of an optical disc like in Embodiment 2.

The objective lens driving device 103 includes a movable body including an objective lens 301, an objective lens 302, a lens holder 303, focusing coils 304a through 304d, and tracking coils 305a and 305b.

The lens holder 303 is formed of a resin, and supports the objective lenses 301 and 302. The objective lens 301 is used to perform recording or reproduction on or from an optical disc having a low recording density such as a CD, a DVD or the like. The objective lens 302 is used to perform recording or reproduction on or from an optical disc having a high recording density such as a BD or the like.

On two side surfaces of the lens holder 303 parallel to the tracking direction T, the focusing coils 304a through 304d and the tracking coils 305a and 305b are attached. On two side surfaces of the lens holder 303 parallel to the direction Y, the terminal plates 308 are attached. The focusing coils 304a and 304c are connected to each other in series, and both of two terminals of this assembly are connected to a control circuit (not shown) via the terminal plates 308, wires 309 and a substrate 313. Similarly, the focusing coils 304b and 304d are connected to each other in series, and both of two terminals of this assembly are connected to the control circuit (not shown) via the terminal plates 308, the wires 309 and the substrate 313.

The tracking coils 305a and 305b are connected to each other in series, and both of two terminals of this assembly are connected to the control circuit (not shown) via the terminal plates 308, the wires 309 and the substrate 313.

The objective lens driving device further includes a first magnet 306 and a second magnet 307 for driving the movable body. The first magnet 306 and the second magnet 307 each include a plurality of areas divided by borders so as to correspond to the focusing coils 304a through 304d and the tracking coils 305a and 305b. Each two areas adjacent to each other along each border are magnetized with different polarities. The first magnet 306 and the second magnet 307 are secured to yokes 310.

Bases of the wires 309 are secured to the substrate 313 via a suspension holder 312. The yokes 310, the suspension holder 312 and the substrate 313 are secured to a base 311. The wires 309 are formed of an elastic metal material such as beryllium copper, bronze or the like, and wires or rods having, for example, a circular, polygonal or elliptical cross-section are used as the wires 309. The support center of the wires 309 is set to generally match the center of gravity of the movable body.

The objective lenses 301 and 302 are arranged on the lens holder 303 in the direction Y. The objective lens 301 is located on the base side of the wires 309 with respect to the support center of the wires 309, and the objective lens 302 is located on the tip side of the wires 309 with respect to the support center of the wires 309.

Figure 23:
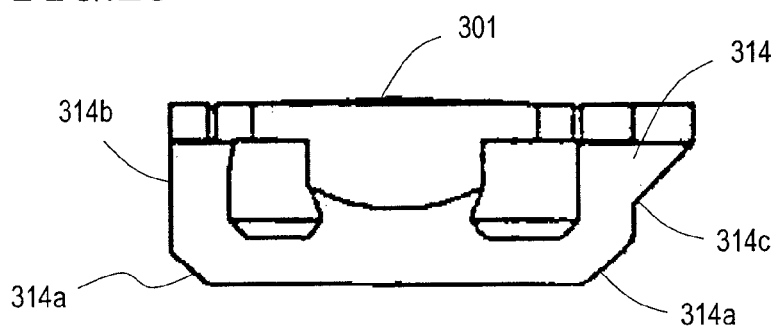
FIG. 23 is a side view of a lens holder according to Embodiment 3.
Figure 24:
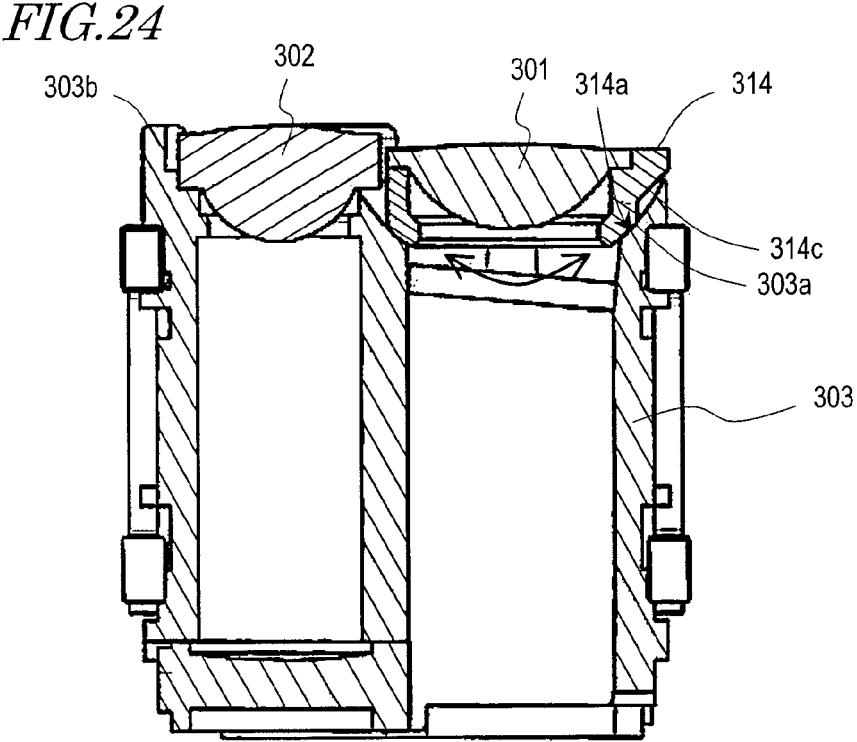
FIG. 24 is a cross-sectional view taken along line A-A in FIG. 21.

FIG. 23 is a side view of a lens holder 314, and FIG. 24 is a cross-sectional view of the lens holder 303 taken along line A-A in FIG. 21. As shown in FIGS. 22 and 24, the lens holder 303 has a spherical recess 303a, on which the objective lens 301 is to be mounted. The objective lens 301 is located on the spherical recess 303a of the lens unit 303 in the form of a lens unit mounted on the lens holder 314 having a spherical projection 314a. Hence, as described in Embodiment 1, the angle of the objective lens 301 can be adjusted independently from the objective lens 302 by sliding the spherical projection 314a of the tilting holder 314 on, and in contact with, the spherical recess 303a of the lens holder 303.

As shown in FIGS. 23 and 24, the lens holder 314 has a flat side surface (D-cut surface) 314b at a position proximate to the objective lens 302. The lens holder 314 also has a cutout 314c formed as a result of cutting out a part of the spherical surface at a position symmetrical to the side surface 314b with respect to the optical axis of the objective lens 301.

Figure 25:
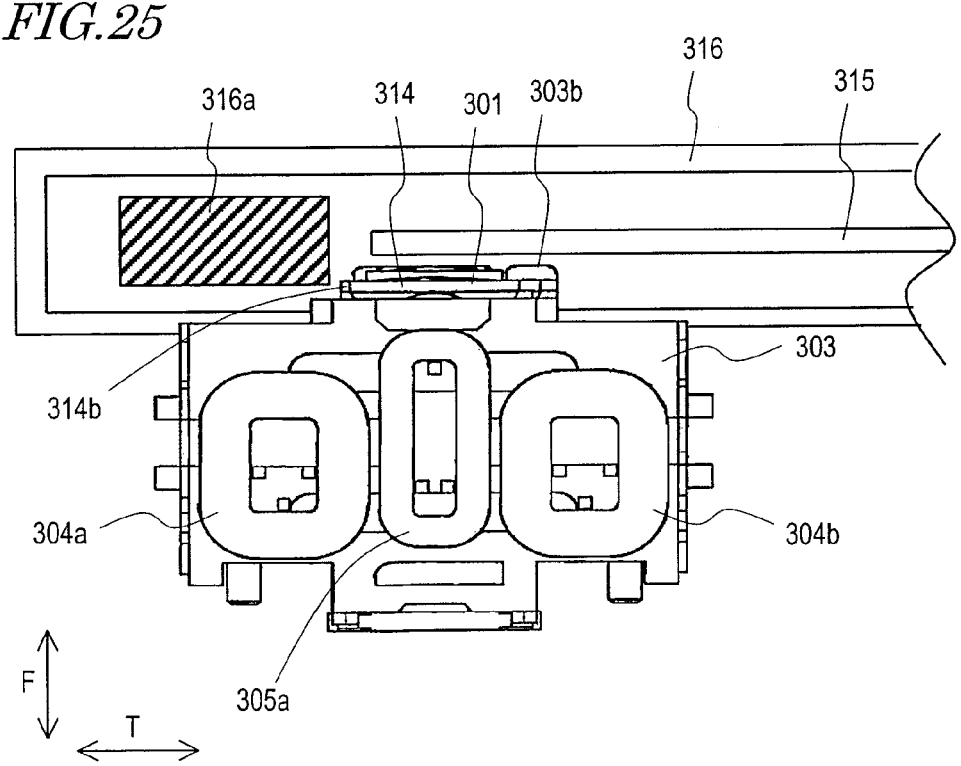
FIG. 25 shows the positional relationship between the objective lens driving device and the optical disc in Embodiment 3.

The lens holder 303 includes a projection 303b around each of the objective lenses 302 and 301, and a top surface of the projection 303b is preferably coated with an impact prevention member formed of a polyurethane-based resin. The impact prevention member prevents the objective lenses 302 and 301 from directly colliding against the optical disc (not shown). As shown in FIG. 25, the projection 303b is formed in an area other than an area facing an outer peripheral area of the optical disc (not shown).

According to this embodiment, two objective lenses are located adjacent to each other on the lens holder, and the objective lens 301 is secured to the lens holder 303 via the lens holder 314. Because the lens holder 314 has the flat side surface 314b at least at a position proximate to the objective lens 302, the objective lenses 301 and 302 can be located as close as possible to each other.

Since the distance between the two lenses can be decreased for this reason, no unnecessary space is made in arranging the optical elements of the optical head. As a result, the optical head can be made compact.

In addition, the two objective lenses are located such that the optical axes thereof are close to each other as described in Embodiment 2. Owing to such an arrangement, the interval between the two through-holes acting as the optical paths of the two objective lenses can also be made small. This decreases the entire size of the movable body, and also reduces the adverse affect of the resonance of the lens holder and realizes a superb displacement frequency response characteristic. Such a superb characteristic guarantees a stable servo performance and thus realizes an optical information apparatus capable of performing a stable recording or reproduction operation.

As shown in FIG. 25, at least the side surface 314b of the lens holder 314 facing the outer peripheral area of the optical disc 315 is flat. Owing to this, when recording or reproduction is performed on or from the optical disc 315 accommodated in a cartridge 316, a cartridge edge 316a facing the outer peripheral area of the optical disc 315 and the lens holder 314 are prevented from contacting each other and thus stable recording or reproduction is realized.

Similarly, the projection 303b of the lens holder 303 is formed in an area other than an area facing the outer peripheral area of the optical disc 315. Owing to this, when recording or reproduction is performed on or from the optical disc 315 accommodated in the cartridge 316, the cartridge edge 316a facing the outer peripheral area of the optical disc 315 and the lens holder 314 are prevented from contacting each other and thus stable recording or reproduction is realized.

As shown in FIGS. 23 and 24, the lens holder 314 has the spherical slidable surface 314a and also the cutout 314c formed by cutting out a part of the spherical surface at a position symmetrical to the flat side surface with respect to the optical axis of the objective lens 301. Owing to this, as shown in FIG. 24, the area by which the lens holder 314 and the lens holder 303 contact each other can be made symmetrical with respect to the optical axis. Therefore, when the lens holder 303 and the lens holder 314 are bonded together with an adhesive, the amount of deforming by heat and the thermal conductivity are symmetrical, and the reliability is improved.

As described above, the objective lens driving device according to this embodiment can be preferably combined with Embodiment 2. The objective lens driving device according to this embodiment may also be combined with Embodiment 1 and Embodiment 2. The objective lens driving device according to this embodiment may also be combined with Embodiment 1.

Embodiment 4

Figure 26:
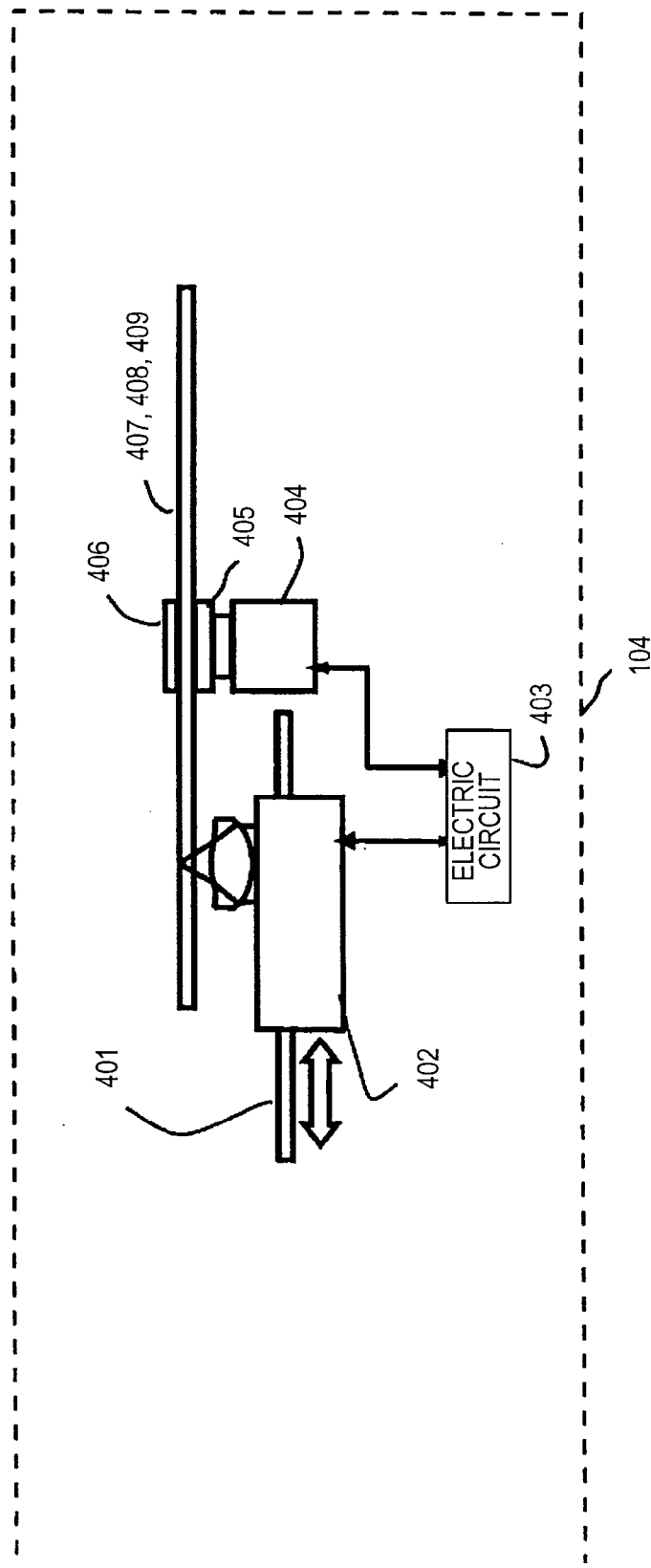
FIG. 26 shows a structure of an optical information apparatus according to Embodiment 4.

An optical information apparatus according to an embodiment of the present invention will be described with reference to FIG. 26.

An optical information apparatus 104 includes an optical pickup 402, an electric circuit 403, and a motor 404.

Optical discs 407 through 409 have different recording densities. The operator selects one of the optical discs, and places the selected optical disc on a turntable 405. The optical disc placed on the turntable 405 is secured thereon by a clamper 406 and is driven to rotate by the motor 404.

As the optical pickup 402, the optical pickup 101 described in Embodiment 1, or the optical pickup including the objective lens driving device 102 or 103 described in Embodiment 2 or 3, can be preferably used.

The optical pickup 402 is movable in the tracking direction by a driving mechanism 401 such as a traverse motor or the like and can jump to a desirable track.

The optical pickup 402 outputs a focusing error signal or a tracking error signal to the electric circuit 403 in correspondence with the positional relationship with the optical discs 407 through 409. In correspondence with such a signal, the electric circuit 403 sends a signal for slightly moving the objective lenses to the optical pickup 402. Based on this signal, the optical pickup 402 performs focusing control or tracking control on the optical discs 407 through 409. Thus, the optical information apparatus 104 performs information reproduction or recording.

According to this embodiment, the optical information apparatus includes an optical pickup according to Embodiment 1 or an objective lens driving device according to Embodiment 2 or 3, and so is capable of performing recording or reproduction on or from a plurality of optical discs having different recording densities at high precision and stably.

Embodiment 5

Figure 27:
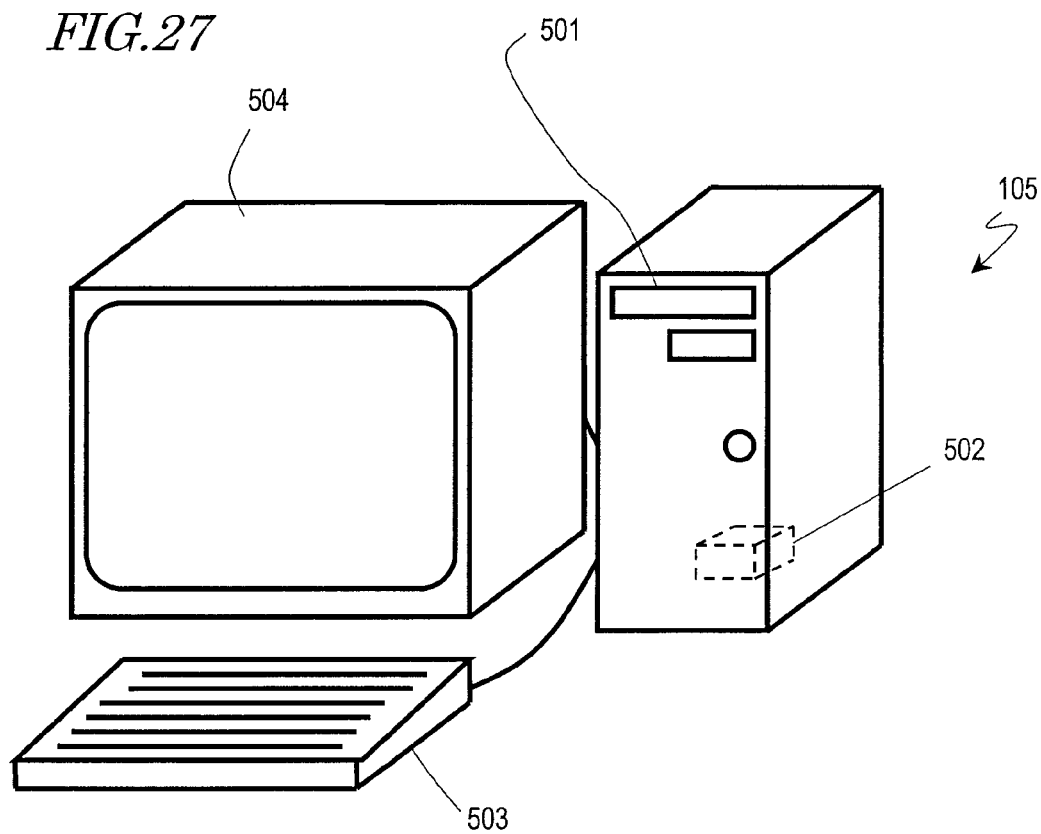
FIG. 27 shows a structure of a computer according to Embodiment 5.

With reference to FIG. 27, a computer according to an embodiment of the present invention will be described.

A computer 105 includes an optical information apparatus 501, which is the same as the optical information apparatus 104 described in Embodiment 4. The computer 105 also includes an input device 503 for inputting information, such as a keyboard, a mouse, a touch panel or the like, and an arithmetic operation device 502 for performing an arithmetic operation based on information input through the input device 503, information read from the optical information apparatus 501 or the like, such as a central processing unit (CPU) or the like.

The computer 105 further includes an output device 504 for displaying information such as an arithmetic operation result provided by the arithmetic operation device 502 or the like, such as a CRT, a liquid crystal display, a printer or the like.

The computer 105 includes the optical information apparatus 501, which is the same as the optical information apparatus described in Embodiment 4. Therefore, the computer 105 is capable of performing a recording or reproduction operation on or from different types of optical discs; for example, an operation of recording video information or data or audio information or data on different types of optical discs, or an operation of reading such information recorded on different types of optical discs to perform information processing or editing, with high precision and stably.

Embodiment 6

Figure 28:
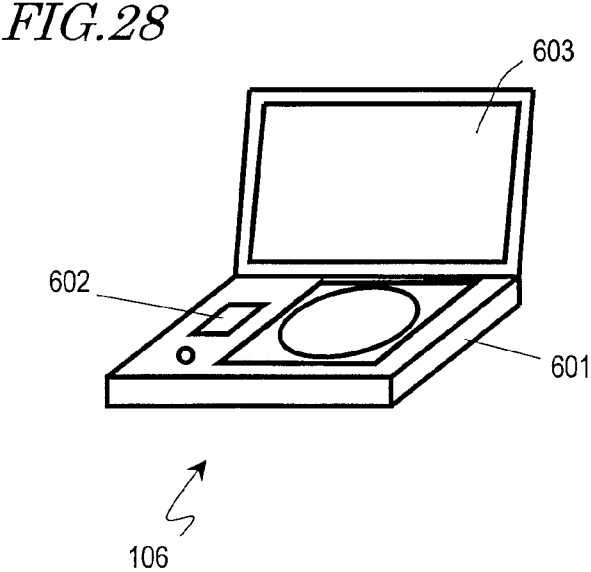
FIG. 28 shows a structure of an optical disc player according to Embodiment 6.

With reference to FIG. 28, an optical disc player according to an embodiment of the present invention will be described.

An optical disc player 106 includes an optical information apparatus 601, which is the same as the optical information apparatus 104 described in Embodiment 4. The optical disc player 106 also includes a conversion device 602 for converting information obtained from the optical information apparatus 601 into an image, such as a decoder or the like. The optical disc player 106 may be used as a car navigation system. The optical disc player 106 may also include a display device 603 such as a liquid crystal monitor or the like.

Embodiment 7

Figure 29:
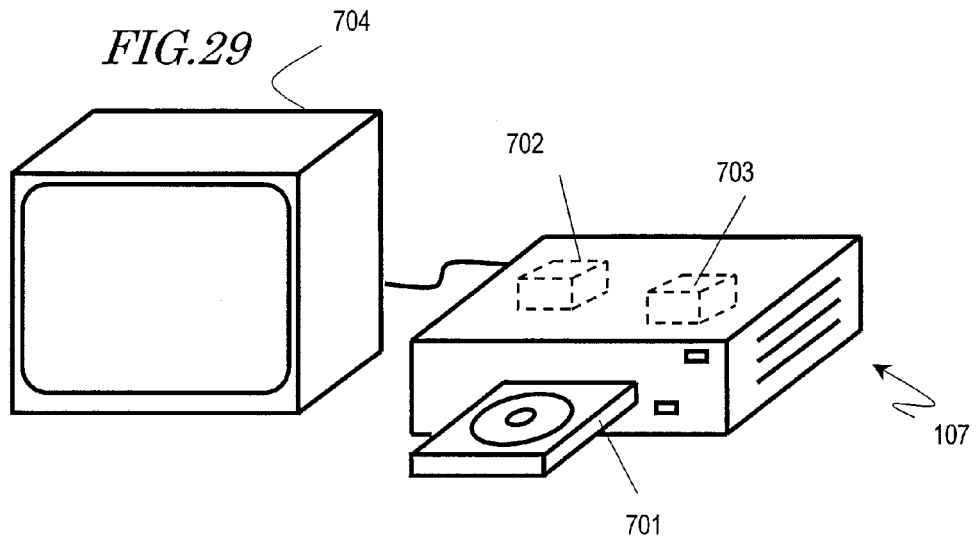
FIG. 29 shows a structure of an optical disc recorder according to Embodiment 7.

With reference to FIG. 29, an optical disc recorder according to an embodiment of the present invention will be described.

An optical disc recorder 107 includes an optical information apparatus 701, which is the same as the optical information apparatus 104 described in Embodiment 4. The optical disc recorder 107 also includes a conversion device 702 for converting image information into information recordable on an optical disc by the optical information apparatus 701, such as an encoder or the like. The optical disc recorder 107 may also include a decoder 703 for converting an information signal obtained from the optical information apparatus 701 into an image. The optical disc recorder 107 may further include an output device 704 for displaying information, such as a CRT, a liquid crystal display, a printer or the like.

Embodiment 8

Figure 30:
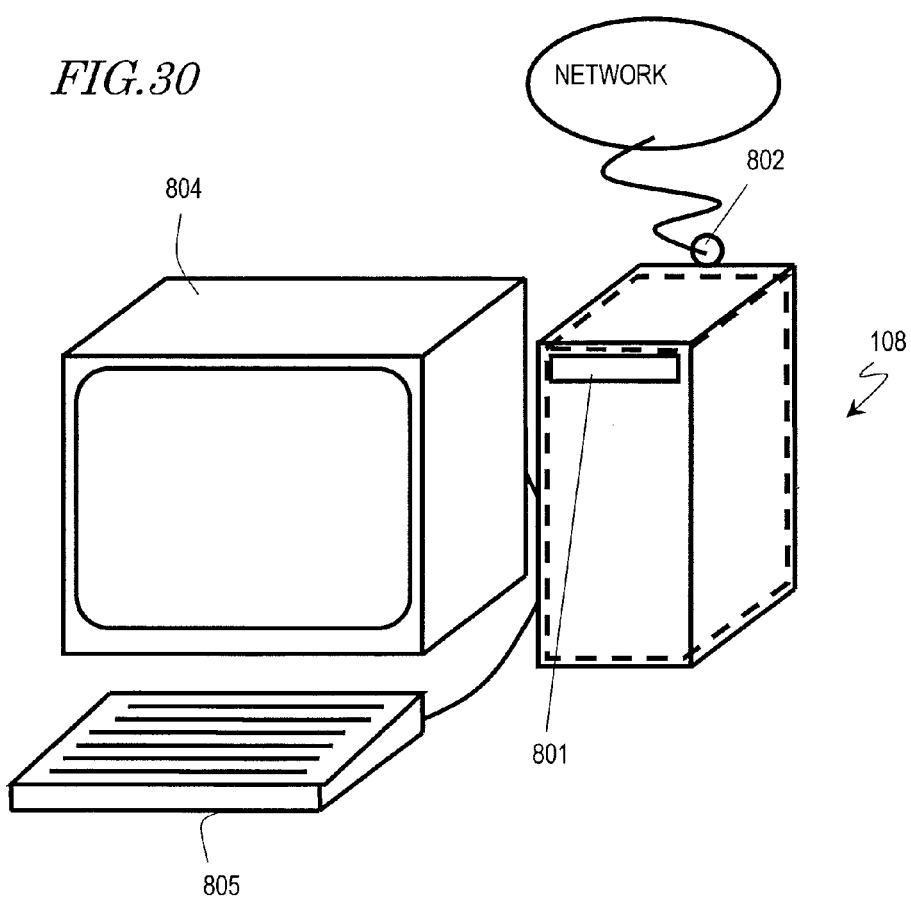
FIG. 30 shows a structure of a server according to Embodiment 8.

With reference to FIG. 30, an optical disc server according to an embodiment of the present invention will be described.

An optical disc server 108 includes an optical information apparatus 801, which is the same as the optical information apparatus 104 described in Embodiment 4. The server 108 also include an input device 805 for inputting information, such as a keyboard, a mouse, a touch panel or the like, and a wired or wireless input/output terminal 802 for obtaining information recordable by the optical information apparatus 801 or outputting information read by the optical information apparatus 801 to an external device. Owing to this, the server 108 acts as an optical disc server for exchanging information with a network, i.e., a plurality of devices, for example, a computer, a telephone, a TV tuner or the like and sharing information with the plurality of devices. The optical disc server 108 may further include an output device 804 for displaying information, such as a CRT, a liquid crystal display, a printer or the like. Where a changer (not shown) for mounting or dismounting a plurality of optical discs on or from the optical information apparatus 801 is provided, the optical disc server 108 can record and accumulate a great amount of information.

Embodiment 9

Figure 31:
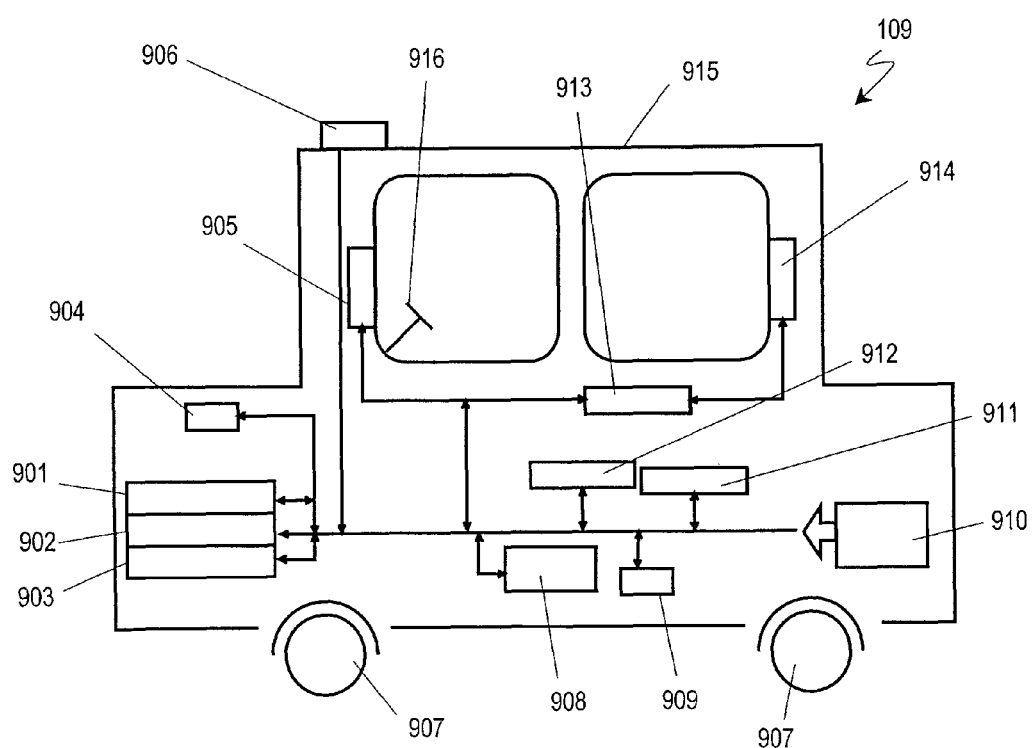
FIG. 31 shows a structure of a vehicle according to Embodiment 9.

With reference to FIG. 31, a vehicle 109 according to an embodiment of the present invention will be described.

The vehicle 109 includes an optical information apparatus 901, which is the same as the optical information apparatus 104 described in Embodiment 4.

The vehicle 109 includes a body 915 and a power generation section 912 for generating power for driving the body 915. The vehicle 109 also includes a fuel storage section 911 for storing a fuel to be supplied to the power generation section 912, or/and a power supply 910. Where the optical information apparatus 901 is mounted on the vehicle 109 having such a structure, the user can obtain information stably from various types of optical discs or record information to various types of optical discs, while being in a movable object. In the case where the vehicle 109 is a train or an automobile, the vehicle 109 further includes wheels 907 for running and a handle 916 for changing the running direction.

Where the vehicle 109 further includes a changer 902 or an optical disc accommodation section 903, a great number of optical discs can be used easily. Where the vehicle 109 includes an arithmetic operation device 908 for processing information obtained from an optical disc to provide an image, a semiconductor memory 909 for temporarily storing information or a display device 905, video information can be reproduced from the optical disc. Where the vehicle 109 includes an amplifier 913 and a speaker 914, audio information or music can be reproduced from the optical disc.

Where the vehicle 109 includes a positional sensor such as a GPS 906 or the like, the current location or the traveling direction can be displayed on the display device 905 together with map information reproduced from the optical disc, and traffic information or navigation information can be output from the speaker 914 in the form of a voice. Where the vehicle 109 further includes a wireless communication section 904, information can be obtained from outside to be used complementarily with the information from the optical disc.

In Embodiments 4 through 9, the output device and the input device are described. The devices described in Embodiments 4 through 9 may include only an input terminal or an output terminal with no output or input device.

INDUSTRIAL APPLICABILITY

The present invention is preferably usable for an optical information apparatus for performing at least recording or reproduction on or from various types of optical discs, such as an optical disc apparatus. The present invention is especially preferably usable for an optical information apparatus, such as an optical disc apparatus, including a plurality of objective lenses.

The invention claimed is:

1. An objective lens unit, comprising:
a first light source;
a second light source;
a first objective lens;
a second objective lens;
a lens holder for supporting the first objective lens and the second objective lens;
an actuator for driving the lens holder; and
a detector;
wherein:
the lens holder includes a first through-hole through which light incident on the first objective lens passes and a second through-hole through which light incident on the second objective lens passes,
light emitted by the first light source is collected on a data recording face of a first optical disc,
light emitted by the second light source is collected on a data recording face of a second optical disc,
the first objective lens and the second objective lens are arranged in a direction perpendicular to a tracking direction of the optical disc, an interval between an optical axis of the first objective lens and an optical axis of the second objective lens is 2.5 mm or greater and 5 mm or less, and the actuator for driving the lens holder is provided with at least one electromagnetic driving element on each of both end faces of the lens holder, the end faces being located along the direction in which the first objective lens and the second objective lens are arranged.

2. An objective lens unit according to claim 1, wherein the at least one electromagnetic driving element includes a tracking coil for driving the lens holder in the tracking direction, and the tracking coil is a flat coil which is wound around an axis perpendicular to the tracking direction.

3. An objective lens unit according to claim 1, wherein the at least one electromagnetic driving element includes a focusing coil for driving the lens holder in a focusing direction, and the focusing coil is a flat coil which is wound around an axis perpendicular to the tracking direction.

4. An objective lens unit according to claim 1, wherein the at least one electromagnetic driving element includes a plurality of focusing coils for driving the lens holder in a focusing direction and a plurality of tracking coils for driving the lens holder in the tracking direction, each of the plurality of focusing coils and the plurality of tracking coils is a flat coil which is wound around an axis perpendicular to the tracking direction.

5. The optical pickup according to claim 1, wherein the first objective lens is used to collect light having a longer wavelength than light collected by the second objective lens.

6. The optical pickup according to claim 1, wherein a focal length of the first objective lens is longer than a focal length of the second objective lens.

7. An optical information apparatus, comprising:
an optical pickup defined by claim 1;
a motor for driving an optical disc to rotate; and
an electric circuit for controlling the optical pickup based on a signal obtained from at least the first light detector of the optical pickup.

8. A computer comprising the optical information apparatus defined by claim 7.

9. An optical disc player comprising the optical information apparatus defined by claim 7.

10. A car navigation system comprising the optical information apparatus defined by claim 7.

11. An optical disc recorder comprising the optical information apparatus defined by claim 7.

12. An optical disc server comprising the optical information apparatus defined by claim 7.

13. A vehicle comprising the optical information apparatus defined by claim 7.

* * * * *